(12) United States Patent
Truog et al.

(10) Patent No.: US 7,132,142 B2
(45) Date of Patent: *Nov. 7, 2006

(54) DRY PAINT TRANSFER LAMINATE FOR USE AS WALL COVERING

(75) Inventors: Keith L. Truog, Crown Point, IN (US); Tamara L. McCartney, Stow, OH (US); Craig W. Potter, Mentor, OH (US); Roger A. Fahlsing, Hobart, IN (US); Diane Ewanko, Mentor, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/457,826

(22) Filed: Jun. 9, 2003

(65) Prior Publication Data

US 2004/0161568 A1    Aug. 19, 2004

Related U.S. Application Data

(63) Continuation-in-part of application No. 10/367,611, filed on Feb. 14, 2003.

(51) Int. Cl.
*B32B 9/00* (2006.01)

(52) U.S. Cl. .................... 428/40.1; 428/40.2; 428/41.3; 428/41.5; 428/41.6; 428/41.8; 428/202; 428/204; 428/354; 428/906

(58) Field of Classification Search ............... 428/40.1, 428/40.2, 41.3, 41.5, 41.6, 41.8, 202, 204, 428/354, 906
See application file for complete search history.

(56) References Cited

U.S. PATENT DOCUMENTS 1,365,715 A    1/1921   Morrison (Continued)

FOREIGN PATENT DOCUMENTS

DE    2 254 430    3/1974

(Continued)

OTHER PUBLICATIONS

Merriam Webster's Collegiate Dictionary, p. 717.*

(Continued)

*Primary Examiner*—Nasser Ahmad
(74) *Attorney, Agent, or Firm*—Renner, Otto, Boisselle & Sklar, LLP

(57) ABSTRACT

This disclosed invention relates to a laminate for use as a wallcovering comprising: a matte release liner having a flexible polymeric matte release backing liner and a matte release coat bonded to the matte release backing liner, and a flexible multi-layer decorative film releasably adhered to the matte release liner, the decorative film comprising a dry paint film layer in contact with the matte release coat, and an adhesive layer bonded to the dry paint film layer on a side thereof opposite the matte release liner, the dry paint film layer comprising a layer of pigment dispersed in a polymeric binder, the matte release coat having a level of tack that preferentially adheres the matte release backing liner to the decorative film sufficient to provide a level of structural support for the decorative film when placing the adhesive side of the paint film layer in contact with a substrate, the matte release coat having a micro-roughened surface for transferring a matte finish to the exposed surface fo the dry paint film layer when the release coat is released from contact with the dry paint film layer, the adhesive layer having a suppressed initial level of tack at room temperature that allows the laminate to adhere to a substrate and be repositioned thereon followed by removal of the matte release liner from the dry paint film layer, the adhesive layer undergoing subsequent build up of adhesion due to the passage of time sufficient to permanently bond the dry paint film layer to the substrate.

45 Claims, 3 Drawing Sheets

U.S. PATENT DOCUMENTS

| | | | |
|---|---|---|---|
| 2,746,893 A | 5/1956 | Matthes | 154/46.8 |
| 3,152,030 A | 10/1964 | Sampson | 156/278 |
| 3,301,741 A | 1/1967 | Henrickson et al. | 161/119 |
| 3,314,838 A | 4/1967 | Erwin | 156/71 |
| 3,331,729 A | 7/1967 | Danielson et al. | 161/162 |
| 3,640,791 A | 2/1972 | Rosenheim | 156/230 |
| 3,666,516 A | 5/1972 | Dunning | 117/3.4 |
| 3,671,236 A | 6/1972 | Van Beusekom | 96/15 |
| 3,743,086 A | 7/1973 | Aldrich | |
| 3,933,702 A | 1/1976 | Caimi et al. | |
| 4,037,008 A | 7/1977 | Tugwell | 428/200 |
| 4,054,697 A | 10/1977 | Reed et al. | 428/40 |
| 4,151,319 A | 4/1979 | Sackoff et al. | 428/40 |
| 4,210,485 A | 7/1980 | Lake | |
| 4,248,762 A | 2/1981 | Hornibrook et al. | 260/42.22 |
| 4,369,157 A | 1/1983 | Conner | 264/246 |
| 4,376,151 A | 3/1983 | Parrotta | 428/323 |
| 4,376,159 A | 3/1983 | Spechler | |
| 4,377,050 A | 3/1983 | Renholts | 40/615 |
| 4,451,522 A | 5/1984 | de Vroom | 428/201 |
| 4,499,130 A | 2/1985 | Questel et al. | 428/42 |
| 4,555,471 A | 11/1985 | Barzynski et al. | |
| 4,556,595 A | 12/1985 | Ochi | 428/143 |
| 4,598,020 A | 7/1986 | Panush | |
| 4,661,182 A | 4/1987 | Lerner | 156/94 |
| 4,737,225 A | 4/1988 | Waugh et al. | 156/242 |
| 4,783,354 A | 11/1988 | Fagan | 428/40 |
| 4,818,589 A | 4/1989 | Johnson et al. | 428/201 |
| 4,919,994 A | 4/1990 | Incremona et al. | 428/141 |
| 5,073,422 A | 12/1991 | Konno et al. | |
| 5,073,457 A | 12/1991 | Blackwell | 428/484 |
| 5,084,317 A | 1/1992 | Epple | |
| 5,134,012 A | 7/1992 | Arakawa et al. | |
| 5,135,798 A | 8/1992 | Muschter et al. | 428/202 |
| 5,141,584 A | 8/1992 | Schuh et al. | |
| 5,141,790 A | 8/1992 | Calhoun et al. | 428/40 |
| 5,169,474 A | 12/1992 | Binder | |
| 5,183,696 A | 2/1993 | Sanderson | 428/194 |
| 5,192,612 A | 3/1993 | Otter et al. | 428/355 |
| 5,196,246 A | 3/1993 | Kauss et al. | 428/39 |
| 5,203,941 A | 4/1993 | Spain et al. | 156/209 |
| 5,215,826 A | 6/1993 | Shimanski et al. | 428/483 |
| 5,229,207 A | 7/1993 | Paquette et al. | 428/355 |
| 5,250,336 A | 10/1993 | Greuse et al. | 428/40 |
| 5,266,372 A | 11/1993 | Arakawa et al. | |
| 5,316,843 A | 5/1994 | Kiryu et al. | |
| 5,342,666 A | 8/1994 | Ellison et al. | 428/46 |
| 5,346,766 A | 9/1994 | Otter et al. | 428/355 |
| 5,413,829 A | 5/1995 | Brown et al. | 428/40 |
| 5,441,784 A | 8/1995 | Smith | 428/40 |
| 5,451,440 A | 9/1995 | Tynan, Jr. | |
| 5,460,855 A | 10/1995 | Andersson | |
| 5,468,532 A | 11/1995 | Ho et al. | 428/40 |
| 5,476,901 A | 12/1995 | Smith et al. | 525/100 |
| 5,487,929 A | 1/1996 | Rusincovitch, Jr. et al. | 428/40 |
| 5,489,359 A | 2/1996 | Yamane | 156/540 |
| 5,490,893 A | 2/1996 | Enlow et al. | 156/230 |
| 5,498,305 A | 3/1996 | Mailloux | |
| 5,506,031 A | 4/1996 | Spain et al. | |
| 5,518,786 A | 5/1996 | Johnson et al. | 428/40.6 |
| 5,591,290 A | 1/1997 | Walter et al. | 156/152 |
| 5,591,513 A | 1/1997 | Mahling | |
| 5,633,225 A | 5/1997 | Fredj et al. | |
| 5,639,539 A | 6/1997 | DeProspero et al. | 428/195 |
| 5,641,835 A | 6/1997 | Smith et al. | 525/102 |
| 5,643,668 A | 7/1997 | Calhoun et al. | 428/343 |
| 5,658,646 A | 8/1997 | Takano et al. | |
| 5,662,977 A | 9/1997 | Spain et al. | 428/42.1 |
| 5,676,787 A | 10/1997 | Rusincovitch et al. | 156/277 |
| 5,686,186 A | 11/1997 | Enlow et al. | |
| 5,707,482 A | 1/1998 | Fusselman | 156/577 |
| 5,707,697 A | 1/1998 | Spain et al. | 428/31 |
| 5,725,712 A | 3/1998 | Spain et al. | 156/230 |
| 5,728,469 A | 3/1998 | Mann et al. | 428/418 |
| 5,741,620 A | 4/1998 | Holmes et al. | |
| 5,750,234 A | 5/1998 | Johnson et al. | 428/141 |
| 5,785,790 A | 7/1998 | Olsen et al. | 156/239 |
| 5,788,796 A | 8/1998 | Look et al. | 156/277 |
| 5,795,636 A | 8/1998 | Keller et al. | 428/40.1 |
| 5,814,402 A | 9/1998 | Smith | 428/354 |
| 5,853,876 A | 12/1998 | Takano et al. | |
| 5,866,220 A | 2/1999 | Rusincovitch et al. | 428/40.1 |
| 5,897,742 A | 4/1999 | Semmler | |
| 5,904,968 A | 5/1999 | Langan | 428/41.8 |
| 5,916,643 A | 6/1999 | Spain et al. | 428/31 |
| 5,939,479 A | 8/1999 | Reaves et al. | 524/276 |
| 5,985,079 A | 11/1999 | Ellison | 156/244.23 |
| 5,989,707 A | 11/1999 | Takizawa et al. | 428/343 |
| 6,020,062 A | 2/2000 | Questel et al. | 428/354 |
| 6,042,678 A | 3/2000 | Johnson et al. | 156/246 |
| 6,083,616 A | 7/2000 | Dressler | 428/323 |
| 6,086,995 A | 7/2000 | Smith | 428/352 |
| 6,096,396 A | 8/2000 | Patton et al. | 428/40.1 |
| 6,129,965 A | 10/2000 | Langan | 428/41.8 |
| 6,153,283 A | 11/2000 | Pierson et al. | 428/141 |
| 6,193,918 B1 | 2/2001 | McGuire et al. | 264/167 |
| 6,194,064 B1 | 2/2001 | Keely et al. | 428/355 |
| 6,214,453 B1 | 4/2001 | Kano | 428/245 |
| 6,221,485 B1 | 4/2001 | Sanchez et al. | 428/352 |
| 6,235,363 B1 | 5/2001 | Bilodeau | 428/40.1 |
| 6,248,427 B1 | 6/2001 | Ast | |
| 6,296,732 B1 | 10/2001 | Enlow et al. | 156/209 |
| 6,312,777 B1 | 11/2001 | Smith | 428/41.8 |
| 6,336,988 B1 | 1/2002 | Enlow et al. | 156/238 |
| 6,349,754 B1 | 2/2002 | Johnson | 156/221 |
| 6,364,992 B1 | 4/2002 | Nambu et al. | 156/277 |
| 6,376,058 B1 | 4/2002 | Schut et al. | |
| 6,394,165 B1 | 5/2002 | Rader | |
| 6,399,193 B1 | 6/2002 | Ellison | |
| 6,447,630 B1 | 9/2002 | Disano et al. | |
| 6,461,422 B1 | 10/2002 | Yang et al. | |
| 6,475,616 B1 | 11/2002 | Dietz et al. | 428/355 |
| 6,482,488 B1 | 11/2002 | Janssen et al. | |
| 6,493,918 B1 | 12/2002 | Bell et al. | |
| 6,509,075 B1 | 1/2003 | McCurry et al. | |
| 6,541,109 B1 | 4/2003 | Kumar et al. | 428/352 |
| 6,554,044 B1 | 4/2003 | Paulson et al. | |
| 6,576,327 B1 | 6/2003 | Weissmann et al. | |
| 6,613,411 B1 | 9/2003 | Kollaja et al. | |
| 6,617,008 B1 | 9/2003 | Kono et al. | 428/195 |
| 6,630,049 B1 | 10/2003 | Hannington et al. | 156/289 |
| 6,649,003 B1 | 11/2003 | Spain et al. | |
| 6,703,089 B1 | 3/2004 | DeProspero et al. | |
| 6,740,379 B1 | 5/2004 | Congard et al. | |
| 6,756,095 B1 | 6/2004 | Sandt et al. | |
| 6,773,653 B1 | 8/2004 | Miller et al. | |
| 6,783,816 B1 | 8/2004 | Golub et al. | |
| 6,808,586 B1 | 10/2004 | Steinhardt | |
| 6,866,383 B1 | 3/2005 | Naik et al. | |
| 6,875,800 B1 | 4/2005 | Vanier et al. | |
| 6,916,532 B1 | 7/2005 | Yanagiuchi | 428/354 |
| 6,984,429 B1 | 1/2006 | Thunhorst et al. | 428/41.8 |
| 2002/0142155 A1 | 10/2002 | Steinberg | 428/343 |
| 2002/0182955 A1 | 12/2002 | Weglewski et al. | |
| 2002/0197398 A1 | 12/2002 | Scholz et al. | 427/207.1 |
| 2003/0026932 A1 | 2/2003 | Johnson et al. | |
| 2003/0134114 A1 | 7/2003 | Pallotta et al. | 428/354 |
| 2003/0157287 A1 | 8/2003 | Song | 428/40.1 |
| 2004/0076788 A1 | 4/2004 | Steinhardt et al. | 428/57 |
| 2004/0126529 A1 | 7/2004 | Squier et al. | |
| 2004/0170855 A1 | 9/2004 | Kawabata | 428/500 |
| 2004/0200564 A1 | 10/2004 | Kinsey et al. | 156/230 |
| 2004/0253421 A1* | 12/2004 | Truog et al. | 428/195.1 |
| 2004/0253422 A1* | 12/2004 | Truog et al. | 428/195.1 |

| | | | |
|---|---|---|---|
| 2004/0253423 A1* | 12/2004 | Truog et al. ............. 428/195.1 | |
| 2005/0003129 A1* | 1/2005 | Truog et al. ............... 428/40.1 | |
| 2005/0092420 A1 | 5/2005 | Kinne et al. | |
| 2006/0073318 A1 | 4/2006 | Tuttle et al. ................ 428/500 | |
| 2006/0088695 A1 | 4/2006 | Coburn ....................... 428/172 | |
| 2006/0093776 A1 | 5/2006 | Crum ........................ 428/40.1 | |

FOREIGN PATENT DOCUMENTS

| | | |
|---|---|---|
| DE | 35 43 777 A1 | 6/1987 |
| DE | 197 35 958 A1 | 2/1999 |
| DE | 198 37 774 A1 | 2/2000 |
| EP | 0 569 921 B1 | 1/1993 |
| EP | 0569921 | 11/1993 |
| EP | 0 623 477 A2 | 11/1994 |
| EP | 0 993 876 A1 | 4/2000 |
| EP | 1 018 533 A2 | 7/2000 |
| EP | 1 055 514 A2 | 11/2000 |
| EP | 1053793 | 11/2000 |
| EP | 1 226 958 A1 | 7/2002 |
| EP | 0 752 498 B1 | 6/2003 |
| GB | 1 232 971 | 5/1971 |
| JP | 08/034959 A1 | 2/1996 |
| JP | 10/278187 A1 | 1/1999 |
| WO | 94/03337 | 2/1994 |
| WO | 95/17312 | 6/1995 |
| WO | 99/37479 | 7/1999 |
| WO | WO 00/001527 A1 | 1/2000 |
| WO | 01/00411 A1 | 1/2001 |
| WO | 01/79372 A2 | 10/2001 |
| WO | 03/053719 A2 | 7/2003 |
| WO | 03/062341 A2 | 7/2003 |
| WO | 03/095238 A1 | 11/2003 |
| WO | 04/0629032 A2 | 7/2004 |
| WO | 05/007397 A1 | 1/2005 |
| WO | 05/075591 A1 | 8/2005 |

OTHER PUBLICATIONS

Avery Dennison Corporation et al., PCT Patent Application entitled "Method & System for Digital Media Design," International Application No. PCT/US02/11514, filed Apr. 11, 2002; PCT Response to Invitation to Correct Priority Claim and PCT Response to Invitation to Pay Prescribed Fees Together with Late Payment Fee dated Jul. 24, 2002.

International Search Report, Application No. PCT/US02/40946, dated Aug. 25, 2003.

International Search Report, Application No. PCT/US02/40945, dated Aug. 25, 2003.

International Search Report, Application No. PCT/US03/15043, dated Oct. 21, 2003.

U.S. Appl. No. 10/367,611, filed Feb. 14, 2003.
U.S. Appl. No. 10/457,806, filed Jun. 9, 2003.
U.S. Appl. No. 10/457,791, filed Jun. 9, 2003.
U.S. Appl. No. 10/457,827, filed Jun. 9, 2003.
U.S. Appl. No. 10/457,790, filed Jun. 9, 2003.

PCT International Search Report and Written Opinion, for Serial No. PCT/US04/04012, mailed Sep. 9, 2004.

PCT International Search Report and Written Opinion, for Serial No. PCT/US2004/04386, mailed Jul. 21, 2004.

PCT International Search Report and Written Opinion, for Serial No. PCT/US04/03846, mailed Aug. 23, 2004.

U.S. Appl. No. 10/779,480, filed Feb. 13, 2004.
U.S. Appl. No. 10/779,526, filed Feb. 13, 2004.
U.S. Appl. No. 10/779,528, filed Feb. 13, 2004.
U.S. Appl. No. 10/779,534, filed Feb. 13, 2004.
U.S. Appl. No. 11/198,661, filed Aug. 5, 2005.
U.S. Appl. No. 11/203,911, filed Aug. 15, 2005.
U.S. Appl. No. 11/204,304, filed Aug. 15, 2005.
U.S. Appl. No. 11/248,047, filed Oct. 12, 2005.

* cited by examiner ced layer
DRY PAINT TRANSFER LAMINATE FOR USE AS WALL COVERING This application is a continuation-in-part of U.S. application Ser. No. 10/367,611, filed Feb. 14, 2003, which is incorporated herein by reference in its entirety.

TECHNICAL FIELD

This invention relates to dry paint transfer laminates which are useful as wall coverings. These laminates comprise a dry paint film layer, an adhesive layer overlying one side of the dry paint film layer, and a release liner overlying the other side of the dry paint film layer.

BACKGROUND OF THE INVENTION

Conventional painting using liquid paint requires set up steps involving masking off areas not to be painted and the spreading of drop cloths. Conventional painting also requires messy clean up of brushes, rollers, and the like, the problem of spills, exposure to fumes, and delays while the paint dries. When special effects such as faux finishes are desired, additional time and effort is required to apply additional coats.

The present invention provides a solution to these problems. With the present invention it is not necessary to mask off areas that are not to be painted and it is not necessary to use drop cloths. The messy clean up of brushes, rollers, and the like is avoided. Spills and exposure to fumes are avoided. Delays waiting for paint to dry are avoided. Special effects such as faux finishes can be accomplished with a single application.

SUMMARY OF THE INVENTION

This invention relates to a laminate for use as a wallcovering comprising:

a matte release liner having a flexible polymeric matte release backing liner and a matte release coat bonded to the matte release backing liner, and a flexible multi-layer decorative film releasably adhered to the matte release liner, the decorative film comprising a dry paint film layer in contact with the matte release coat, and an adhesive layer bonded to the dry paint film layer on a side thereof opposite the matte release liner, the dry paint film layer comprising a layer of pigment dispersed in a polymeric binder, the matte release coat having a level of tack that preferentially adheres the matte release backing liner to the decorative film sufficient to provide a level of structural support for the decorative film when placing the adhesive side of the paint film layer in contact with a substrate, the matte release coat having a micro-roughened surface for transferring a matte finish to the exposed surface fo the dry paint film layer when the release coat is released from contact with the dry paint film layer, the adhesive layer having a suppressed initial level of tack at room temperature that allows the laminate to adhere to a substrate and be repositioned thereon followed by removal of the matte release liner from the dry paint film layer, the adhesive layer undergoing subsequent build up of adhesion due to the passage of time sufficient to permanently bond the dry paint film layer to the substrate.

In one embodiment, the initial level of tack provided by the matte release coat is sufficient for maintaining adherence of the matte release liner to the decorative film during positioning of the decorative film on the substrate while being releasable from the dry paint film layer surface when the dry paint film layer is conformed to and adhered to the substrate.

In one embodiment, the level of gloss transferred from the matte release liner to the dry paint film layer is less than 30% at 85° F.

In one embodiment, a clear coat film overlies the dry paint film layer, and the clear coat film being in contact with the matte release coat.

In one embodiment, the combined film thickness of the dry paint film layer and the adhesive layer is less than 20 mils.

In one embodiment, the combined dry paint film layer and adhesive layer are opaque.

In one embodiment, the matte release liner is essentially non-stretchable at room temperature.

In one embodiment, a reinforcing polymeric support layer overlies the dry paint film layer, the support layer having a tensile strength greater than the dry paint film layer.

In one embodiment, the matte release coat provides a differential release function in which the matte release liner preferentially adheres to the decorative film when the laminate is in a rolled-up condition and when the laminate is positioned on and adhered to the substrate, but in which the matte release liner is subsequently releasable from the dry paint film layer when the dry paint film layer has been conformed to and adhered to the substrate.

In one embodiment, the invention relates to a dry paint transfer laminate for use as a wall covering comprising:

a flexible matte release liner having a matte release coat, and a flexible multilayer decorative film comprising a dry paint film layer releasably contacting the matte release coat, and an adhesive layer bonded to the dry paint film layer on a side thereof opposite the matte release liner, the dry paint film layer comprising a layer of pigment dispersed in a polymeric binder, the matte release coat transferring a matte finish to the exposed surface of the dry paint film layer when the release coat is released from contact with the dry paint film layer, the adhesive layer allowing initial adhesion of the combined release liner and decorative film to the substrate and repositioning thereon while providing a permanent bond to the substrate after the passage of time.

In one embodiment, the invention relates to a dry paint transfer laminate for use as a wall covering comprising:

a matte release liner having a matte release coat, a dry paint film layer releasably adhered to the matte release coat, the dry paint film layer comprising a layer of pigment dispersed in a polymeric binder, and a pressure sensitive adhesive layer bonded to the dry paint film layer on a side thereof opposite the matte release liner, the adhesive layer active at room temperature for adhering the dry paint film layer and its adhered matte release liner to a substrate, the matte release liner being releasable from the dry paint film layer for transferring a low gloss matte surface from the release coat to the dry paint film layer.

BRIEF DESCRIPTION OF THE DRAWINGS

In the annexed drawings, like references indicate like parts or features.

DESCRIPTION OF THE PREFERRED EMBODIMENTS

The terms "over" and "overlies" and cognate terms such as "overlying" and the like, when referring to the relationship of one or a first layer relative to another or a second layer, refers to the fact that the first layer partially or completely lies over the second layer. The first layer overlying the second layer may or may not be in contact with the second layer. For example, one or more additional layers may be positioned between the first layer and the second layer. The terms "under" and "underlies" and cognate terms such as "underlying" and the like have similar meanings except that the first layer partially or completely lies under, rather than over, the second layer.

The term "dry paint" refers to a paint composition which has been applied to a substrate and has dried or cured sufficiently so that it does not smear or smudge when touched or handled by the user. The dry paint composition may be derived from a liquid (i.e., solvent based or water based) coating or film forming composition or a hot melt coating or film forming composition. In one embodiment, the dry paint composition may be derived from a composition containing one or more volatile components (e.g., organic solvent, water, etc.) wherein the paint composition is applied to a substrate and allowed to dry to the extent that the volatile components are removed completely or sufficiently to permit the paint to adhere to the substrate and not smear or smudge when touched by the user. The term "volatile" is used herein to refer to materials that are volatile at the drying temperature and atmospheric pressure.

The term "transparent" when referring to the transparent film layer overlying one or more of the dry paint film layers of the inventive dry paint transfer laminate means that the one or more dry paint film layers can be seen through the transparent film layer. The transparent film layer may be translucent.

Figure 1:
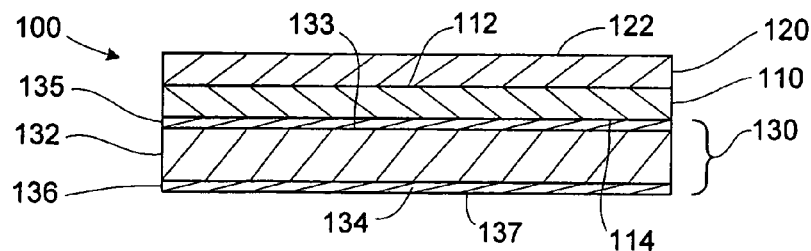
FIG. 1 is a schematic illustration of the side view of a dry paint transfer laminate embodying the present invention in a particular form.

Referring to FIG. 1, the inventive dry paint transfer laminate, in one of its illustrated embodiments, is generally indicated by the reference numeral 100, and comprises: a dry paint film layer 110 which has an upper surface 112 and a lower surface 114; an adhesive layer 120 overlying and adhered to upper surface 112; and a release liner 130 overlying and adhered to the lower surface 114. The release liner 130 comprises: a backing liner 132 which has an upper surface 133 and a lower surface 134; a first release coating layer 135 overlying and adhered to the upper surface 133, the release coating layer 135 sometimes being referred to herein as a matte release coating; and a second release coating layer 136 overlying and adhered to the lower surface 134. The matte release layer 135 is positioned between the upper surface 133 of backing liner 132 and the lower surface 114 of dry paint film layer 110, and preferentially adheres to the upper surface 133 of backing liner 132. Thus, when the release liner 130 is peeled away from the dry paint film layer 110, the release coating layer 135 separates from the dry paint film layer 110 and remains adhered to the backing liner 132. The lower surface 137 of release layer 136 is adapted for contacting the upper surface 122 of adhesive layer 120 when the laminate 100 is wound into roll form as illustrated in FIG. 2.

Figure 2:
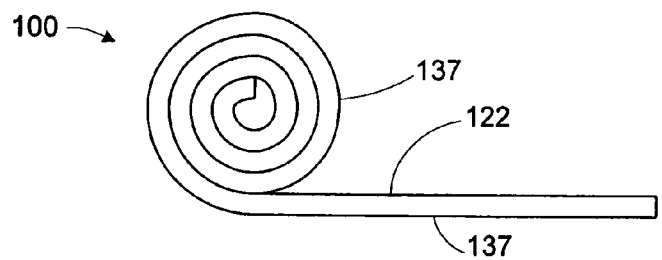
FIG. 2 is a schematic illustration of the dry paint transfer laminate illustrated in FIG. 1, the laminate being partially wound into a roll.

Referring to FIG. 2, the dry paint transfer laminate 100 is wound into roll form with the lower surface 137 of release coating layer 136 in contact with the upper surface 122 of adhesive layer 120. The release coating layer 136 preferentially adheres to backing liner 132. Thus, when the dry paint transfer laminate 100 illustrated in FIG. 2 is unwound, the release coating layer 136 separates from adhesive layer 120 and remains adhered to backing liner 132.

Figure 3:
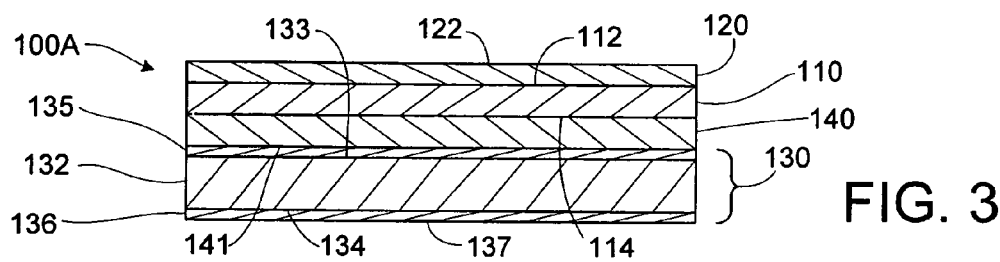
FIG. 3 is a schematic illustration of the side view of another embodiment of the dry paint transfer laminate of the present invention.

The dry paint transfer laminate 100A illustrated in FIG. 3 is identical to the dry paint transfer laminate 100 illustrated in FIG. 1 except that transparent film layer 140 is positioned between dry paint film layer 110 and release coating layer 135. The release coating layer 135 is adhered to transparent film layer 140 on one side and to backing liner 132 on the other side, and is preferentially adhered to backing liner 132. Thus, when the release liner 130 is peeled away from the transparent film layer 140, the release coating layer 135 separates from the transparent film layer 140 and remains adhered to the backing liner 132.

Figure 4:
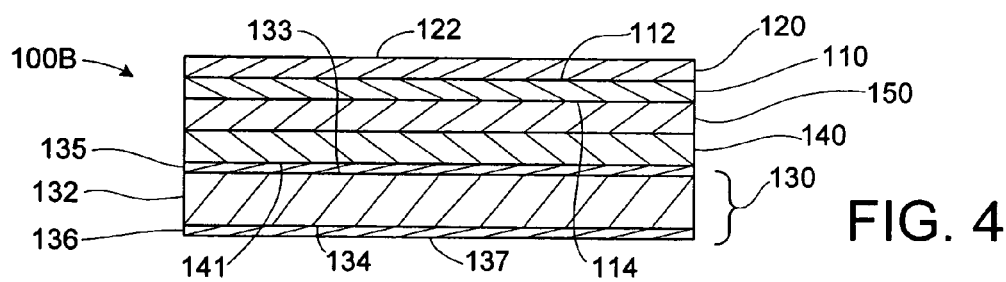
FIG. 4 is a schematic illustration of the side view of still another embodiment of the dry paint transfer laminate of the present invention.

The dry paint transfer laminate 100B illustrated in FIG. 4 is identical to the dry paint transfer laminate 100A illustrated in FIG. 3 except that printed decorative layer 150 is positioned between dry paint film layer 110 and transparent film layer 140.

Figure 5:
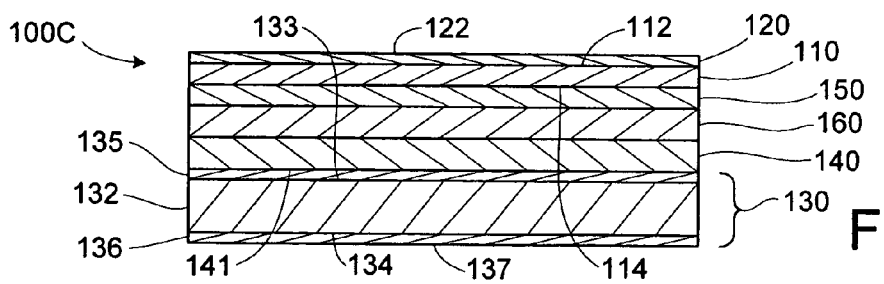
FIG. 5 is a schematic illustration of the side view of still another embodiment of the dry paint transfer laminate of the present invention.

The dry paint transfer laminate 100C illustrated in FIG. 5 is identical to the dry paint transfer laminate 100B illustrated in FIG. 4 except that second printed decorative layer 160 is positioned between printed decorative layer 150 and transparent film layer 140.

Additional printed decorative layers beyond layers 150 and 160 may be used. For example, the inventive laminates may contain up to about 5 or more, and in one embodiment about 3 or about 4, printed decorative layers overlying one another. The printed decorative layers may provide a desired print or design and may be applied using conventional printing methods such as gravure, flexography, silk screen ink jet, etc.

Figure 6:
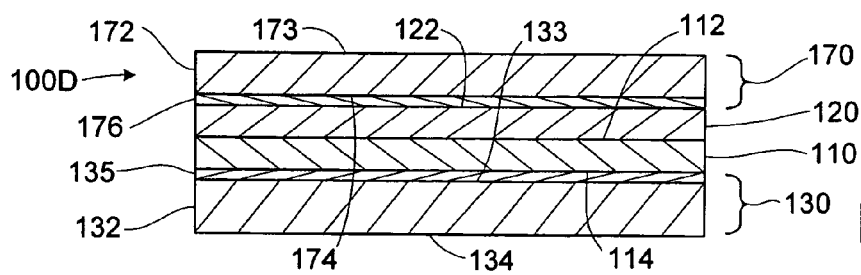
FIG. 6 is a schematic illustration of the side view of still another embodiment of the dry paint transfer laminate of the present invention.

The dry paint transfer laminate 100D illustrated in FIG. 6 is identical to the laminate 100 illustrated in FIG. 1 except that release coating layer 136 is not present, and additional release liner 170 has been added to overlie adhesive layer 120. Release liner 170 comprises: a backing liner 172 which has an upper surface 173 and a lower surface 174; and a release coating layer 176 overlying and adhered to the lower surface 174. The release layer 176 is positioned between the lower surface 174 of backing liner 172 and the upper surface 122 of adhesive layer 120, and preferentially adheres to the lower surface 174 of backing liner 172. Thus, when the release liner 170 is peeled away from the adhesive layer 120, the release coating layer 176 separates from the adhesive layer 120 and remains adhered to the backing liner 172.

Figure 7:
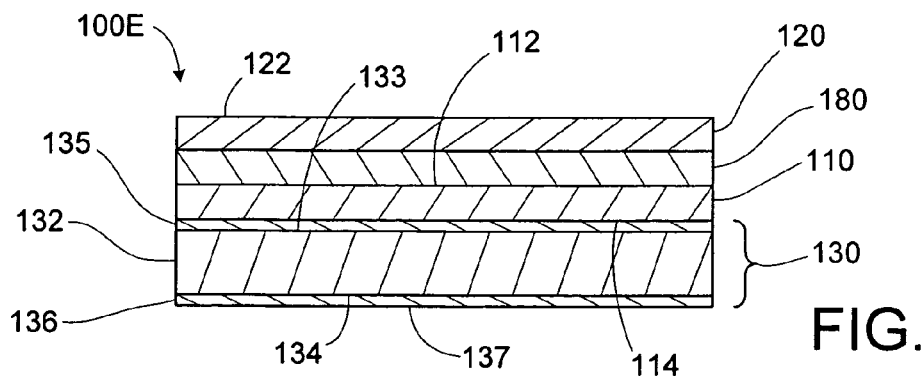
FIG. 7 is a schematic illustration of the side view of still another embodiment of the dry paint transfer laminate of the present invention.

The dry paint transfer laminate 100E illustrated in FIG. 7 is identical to the laminate 100 illustrated in FIG. 1 except that the laminate 100E includes support layer 180 positioned between dry paint film layer 110 and adhesive layer 120.

Figure 8:
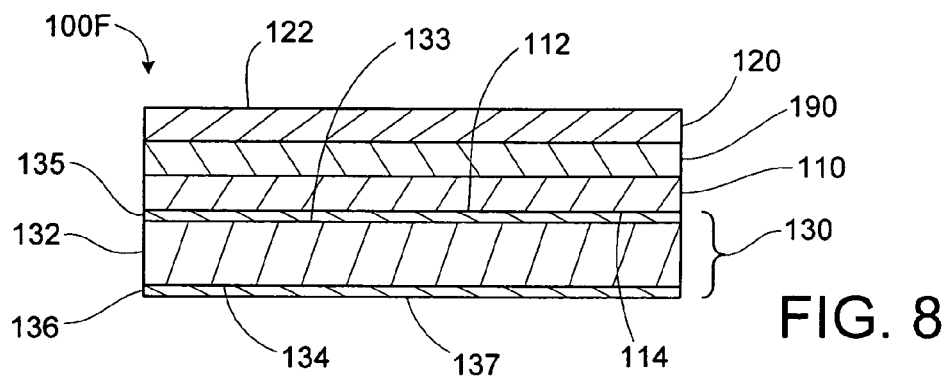
FIG. 8 is a schematic illustration of the side view of still another embodiment of the dry paint transfer laminate of the present invention.

The dry paint transfer laminate 100F illustrated in FIG. 8 is identical to the laminate 100 illustrated in FIG. 1 except that the laminate 100F includes barrier layer 190 positioned between the dry paint film layer 110 and the adhesive layer 120.

Figure 9:
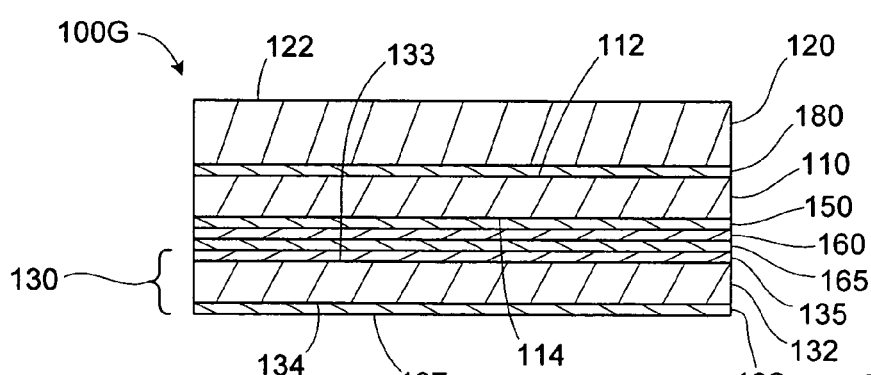
FIG. 9 is a schematic illustration of the side view of still another embodiment of the dry paint transfer laminate of the present invention.

The dry paint transfer laminate 100G illustrated in FIG. 9 is identical to the laminate 100 illustrated in FIG. 1 except that the laminate 100G includes support layer 180 positioned between the dry paint film layer 110 and the adhesive layer 120. Also, the laminate 100G includes printed decorative layers 150, 160 and 165 positioned between the dry paint film layer 110 and the first release coating layer 135.

Figure 10:
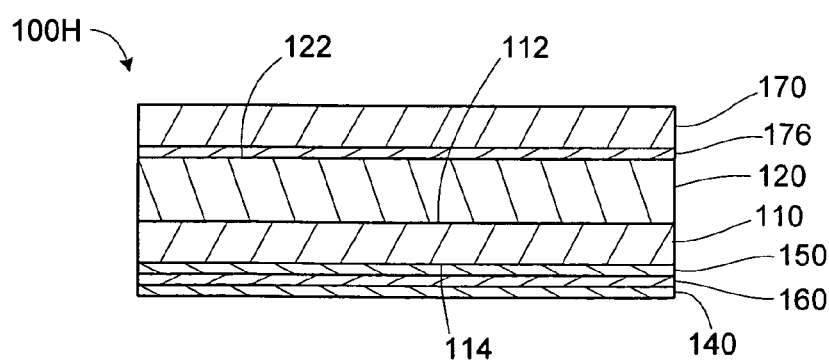
FIG. 10 is a schematic illustration of the side view of still another embodiment of the dry paint transfer laminate of the present invention.

The dry paint transfer laminate 100H illustrated in FIG. 10 is identical to the dry paint transfer laminate 100C illustrated in FIG. 5 except that the release liner 130 in laminate 100C is not present, and release liner 170 overlies adhesive layer 120 and release layer 176 is positioned between release liner 170 and adhesive layer 120.

The dry paint film layer 110 may have a thickness of about 0.5 to about 1.5 mils, and in one embodiment about 0.5 to about 1.2 mils, and in one embodiment about 0.5 to about 0.9 mil, and in one embodiment about 0.7 mil. The thickness of the adhesive layer 120 may range from about 0.4 to about 1 mil, and in one embodiment about 0.4 to about 0.8 mil, and in one embodiment about 0.4 to about 0.6 mil. The thickness of the backing liner 132 may range from about 0.5 to about 2 mils, and in one embodiment about 0.5 to about 1.5 mils, and in one embodiment about 0.85 to about 1.05 mils. The thickness of the first release coating layer 135 may range from about 0.05 to about 0.3 mil, and in one embodiment about 0.1 to about 0.2 mil. The thickness of the second release coating layer 136 may range from about 0.04 to about 0.2 mil, and in one embodiment about 0.04 to about 0.15 mil, and in one embodiment about 0.04 to about 0.08 mil. The thickness of the transparent film layer 140 may range from about 0.05 to about 0.4 mil, and in one embodiment about 0.05 to about 0.3 mil, and in one embodiment about 0.2 mil. The thickness of the printed decorative layer 150 may range from about 0.02 to about 0.15 mil, and in one embodiment about 0.02 to about 0.08 mils. The thickness of the second printed decorative layer 160 may range from about 0.02 to about 0.15 mil, and in one embodiment about 0.02 to about 0.1 mil. The thickness of the backing liner 172 may range from about 0.5 to about 2 mils, and in one embodiment about 0.5 to about 1.5 mils, and in one embodiment about 0.85 to about 1.05 mils. The thickness of the release coating layer 176 may range from about 0.04 to about 0.2 mil, and in one embodiment about 0.04 to about 0.15 mil, and in one embodiment about 0.04 to about 0.08 mil. The support layer 180 may have a thickness of about 0.3 to about 1.4 mils, and in one embodiment about 0.3 to about 1.1 mils, and in one embodiment about 0.3 to about 0.8 mil, and in one embodiment about 0.3 to about 0.5 mil. When the support layer 180 is used, the overall thickness of the combination of the dry paint film layer 110 and support layer 180 may be in the range of about 0.5 to about 1.5 mils, and in one embodiment about 0.5 to about 1.2 mils, and in one embodiment about 0.5 to about 0.9 mil, and in one embodiment about 0.7 mil. The barrier layer 190 may have a thickness in the range of about 0.01 to about 0.1 mil, and in one embodiment about 0.05 to about 0.1 mil, and in one embodiment about 0.01 to about 0.02 mil. Each of the foregoing thicknesses are dry film thicknesses. The laminates 100 through 100H may have any width and length that is suitable for facilitated use by the user. For example, the width may range from about 1 to about 200 cm, and in one embodiment 10 to 100 cm, and in one embodiment about 30 to about 40 cm. The length may range from about 10 to about 6500 meters, and in one embodiment about 15 to about 1000 meters. In one embodiment, the length may range from about 19 to about 6500 meters. In one embodiment, the length may range from about 17 to about 20 meters. In one embodiment, the laminate may have a width of about 10 to about 20 cm, and a length of about 10 to about 30 cm. The laminates may be provided in the form of flat sheets or in roll form as illustrated in FIG. 2.

The layers 110, 150, 160 and 165 may comprise independently one or more binders or resins, and one or more pigments. The support layer 180 may comprise one or more binders or resins, and optionally one or more pigments. The transparent film layer 140 may comprise one or more binders or resins. These layers may be made from liquid coating or paint compositions comprising the one or more binders or resins, the one or more pigments (if used), water or one or more organic solvents, and optionally one or more additional additives for controlling properties such as rheological properties and the like. The layers 110, 140 and 180 may each comprise independently one or more extruded film layers.

The binder or resin may comprise any binder or resin conventionally used in coating or paint formulations. The binder may comprise a thermoplastic or a thermosetting resin. The binder or resin may be a synthetic resin or a natural resin. The binder or resin may comprise a film forming material, which in one embodiment may be an extrudable film forming material. Examples of useful binders or resins include acrylic resins, vinyl resins, polyester resins, alkyd resins, butadiene resins, styrene resins, phthalic acid or anhydride resins, urethane resins, epoxy resins, and the like. The binder or resin may comprise vinyl and vinylidene polymers or copolymers containing units such as vinyl acetate, vinyl chloride, vinylidene chloride, and the like; hydrocarbon polymers and copolymers containing ethylene or proplene units and oxygenated or halogenated derivatives of ether, butadiene, oxygenated butadiene, isoprene, oxygenated isoprene, butadiene-styrene, butadiene vinyl toluene, isoprene-styrene and the like; polymers or copolymers containing units of acrylic acid, methacrylic acid, their esters, or acrylonitrile; vinylic hydrocarbon monomers reacted with unsaturated materials such as the reaction product of maleic acid or anhydride with styrene; and, broadly, various other resinous rubber-like elastomeric latex polymers and copolymers of ethylenically unsaturated monomers and polymers obtainable in stable aqueous latex form. The binder or resin may comprise a copolymer of vinyl chloride and vinyl acetate. The binder or resin may comprise diphenylmethane diisocyanate, methylene diethyl diisocyanate, isocyanurate, urea-formaldehyde, phenol-formaldehyde, phenolic glue, animal hide glues, and the like. Other examples of binders or resins which may be used include fluorine resins, silicone resins, and fibrin resins.

The binder or resin may include one or more polystyrenes, polyolefins, polyamides, polyesters, polycarbonates, polyvinyl alcohol, polyethylene vinyl alcohol, polyurethanes, polyacrylates, polyvinyl acetates, ionomers and mixtures thereof. The polyolefins may be characterized as having a melt index or melt flow rate of less than about 30, and in one embodiment less than about 20, and in one embodiment less than about 10 as determined by ASTM Test Method 1238.

The polyolefins include polymers and copolymers of ethylene, propylene, 1-butene, etc., or blends of mixtures of such polymers and copolymers. The polyolefins may comprise polymers and copolymers of ethylene and propylene. The polyolefins may comprise propylene homopolymers, and copolymers such as propylene-ethylene and propylene-1-butene copolymers. Blends of polypropylene and polyethylene with each other, or blends of either or both of them with a polypropylene-polyethylene copolymer may be used. The polyolefin film forming materials may have a high propylenic content, either polypropylene homopolymer or propylene-ethylene copolymers or blends of polypropylene and polyethylene with low ethylene content, or propylene-1-butene copolymers or blend of polypropylene and poly-1-butene with low butene content.

Various polyethylenes may be used including low, medium, and high density polyethylenes. The low density range for the polyethylenes may be from about 0.910 to about 0.925 g/cm$^3$, the medium density range may be from about 0.925 to about 0.940 g/cm$^3$, and the high density range may be from about 0.940 to about 0.965 g/cm$^3$. An example of a useful low density polyethylene (LDPE) is Rexene 1017 available from Huntsman.

The propylene homopolymers which may be used either alone or in combination with a propylene copolymer include a variety of propylene homopolymers such as those having melt flow rates (MFR) from about 0.5 to about 20 as determined by ASTM Test D 1238, condition L. In one embodiment, propylene homopolymers having MFR's of less than about 10, and in one embodiment from about 4 to about 10 may be used. The propylene homopolymers may be characterized as having densities in the range of from about 0.88 to about 0.92 g/cm$^3$. A number of useful propylene homopolymers are available commercially from a variety of sources, and some useful polymers include: 5A97, available from Union Carbide and having a melt flow of 12.0 g/10 min and a density of 0.90 g/cm$^3$; DX5E66, also available from Union Carbide and having an MFI of 8.8 g/10 min and a density of 0.90 g/cm$^3$; and WRD5–1057 from Union Carbide having an MFI of 3.9 g/10 min and a density of 0.90 g/cm$^3$. Useful commercial propylene homopolymers are also available from Fina and Montel.

The polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. The polyamide resins include those available from, for example, Union Camp of Wayne, N.J. under the Uni-Rez product line, and dimer-based polyamide resins available from Bostik, Emery, Fuller, Henkel (under the Versamid product line). The polyamides include those produced by condensing dimerized vegetable acids with hexamethylene diamine. Examples of polyamides available from Union Camp include Uni-Rez 2665; Uni-Rez 2620; Uni-Rez 2623; and Uni-Rez 2695.

The polystyrenes include homopolymers as well as copolymers of styrene and substituted styrene such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc.

The polyurethanes include aliphatic as well as aromatic polyurethanes.

The polyesters may be prepared from various glycols or polyols and one or more aliphatic or aromatic carboxylic acids. Polyethylene terephthalate (PET) and PETG (PET modified with cyclohexanedimethanol) are useful film forming materials which are available from a variety of commercial sources including Eastman. For example, Kodar 6763 is a PETG available from Eastman Chemical. Another useful polyester from DuPont is Selar PT-8307 which is polyethylene terephthalate.

Acrylate polymers and copolymers and alkylene vinyl acetate resins (e.g., EVA polymers) may be used. Examples include Escorene UL-7520 (Exxon), a copolymer of ethylene with 19.3% vinyl acetate; Nucrell 699 (DuPont), an ethylene copolymer containing 11% of methacrylic acid, etc.

Ionomers (polyolefins containing ionic bonding of molecular chains) may be used. Examples of ionomers include ionomeric ethylene copolymers such as Surlyn 1706 (DuPont) which is believed to contain interchain ionic bonds based on a zinc salt of ethylene methacrylic acid copolymer. Surlyn 1702 from DuPont is an ionomer that may be used.

Polycarbonates also are useful, and these are available from the Dow Chemical Co. (Calibre) G.E. Plastics (Lexan) and Bayer (Makrolon). These polycarbonates may be obtained by the reaction of bisphenol A and carbonyl chloride in an interfacial process. Molecular weights may vary from about 22,000 to about 35,000, and the melt flow rates may be in the range of from about 4 to about 22 g/10 min.

The pigment may be any pigment used in making decorative coatings. These include opacifying pigments, such as titanium dioxide and zinc oxide, as well as tinting pigments such as carbon black, yellow oxides, brown oxides, tan oxides, raw and burnt sienna or umber, chromium oxide green, phthalocyanine green, phthalocyanine blue, ultramarine blue, cadmium pigments, chromium pigments, and the like. The pigments include organic reds such as azo reds, quinacridone red and perylene red as well as organic yellows such as diarylide yellow. Mixed metal oxide pigments may be used. Filler pigments such as clay, silica, talc, mica, woloastonite wood flour, barium sulfate, calcium carbonate, aluminum silicate, and the like can be added as well in conventional amounts traditionally used in coating and paint formulations.

The solvent may be an organic-based solvent, such as a ketone, ester, aliphatic compound, aromatic compound, alcohol, glycol, glycol ether, etc. These include methylethyl ketone, methylisobutyl ketone, ethyl acetate, white spirits, alkanes, cycloalkanes, benzene, hydrocarbon substituted aromatic compounds (e.g., toluene, the xylenes, etc.), isoparaffinic solvents, and combinations of two or more thereof. Alternatively, water or a water-based solution may be used to form an emulsion with the binder or resin. Water-based solutions include water-alcohol mixtures, and the like. The solvent or water is sufficiently volatile so that when applied to a substrate, the solvent evaporates leaving behind the binder or resin, pigment (if used) and any other additional non-volatile ingredients.

Additional ingredients that may be used include wetting agents; plasticizers; suspension aids; thixotropic agents such as silica; water repellant additives such as polysiloxane compounds; fire retardant additives; biocides; defoamers; flow agents; and the like.

The pigment concentration for the liquid paint or coating composition used to provide the layers 110, 150, 160 and 165 may range from about 10 to about 30% by weight, and in one embodiment about 13 to about 27% by weight. The binder or resin concentration may range from about 20 to about 40% by weight, and in one embodiment about 22 to about 37% by weight. The water or organic solvent concentration may range from about 30 to about 70% by weight, and in one embodiment about 40 to about 60% by weight. The additional ingredients such as wetting agents, suspension agents, etc., may be provided at concentrations known in the art, for example, up to about 5% by weight, and in one embodiment from about 0.1 to about 5% by weight. The coating or paint compositions used in making the layers 110, 150, 160 and 165 may have a pigment volume concentration (PVC) in the range of about 5 to about 35%, and in one embodiment 10 to about 30%. The liquid paint or coating compositions used for making the film layers 110, 150, 160, 165 and 180 may be mixed using known techniques.

The dry paint film layer 110 may comprise a single coat or multiple coats of paint and is in the form of a continuous layer, while the printed decorative layers 150, 160 and 165 may independently be in the form of continuous or discontinuous layers. When multiple coats for the layer 110 are used, each coat may have the same or a different formulation. The layers 150, 160 and/or 165 may have the same color or a different color than the layer 110. The layers 150, 160 and/or 165 may have the same color, or they may have colors that are different from each other. The layer 110 may be used to provide background color while the layers 150, 160 and/or 165 may be used to provide a pattern or design. For example, the layers 150, 160 and/or 165 may be used to provide a faux finish or a "ragging" or "sponging" look. The layers 150, 160 and/or 165 may be used to provide a desired print or design image (e.g., a flowered design) having one or multiple colors. The designs may be in the form of repeat designs or random non-repeat designs.

The transparent film layer 140 may comprise a single coating layeror multiple coats, and may comprise any of the resin materials described above. When multiple coats are used, each coat may have the same or a different formulation. The transparent film layer 140 may be extruded. Specific examples of the resins that may be used include polyvinyl chloride, and copolymers of vinyl chloride and acrylic or methacrylic acid. The transparent film layer 140 is primarily distinguishable from the dry paint film layer 110 by the fact that it is transparent or translucent. The transparent film layer 140, in one embodiment, provides enhanced scuff resistance, stain resistance and/or recoatability to the dry paint film layer or layers underlying it. Enhanced recoatability refers to the fact that the presence of the transparent film layer 140 facilitates the subsequent application of another dry paint film layer or printed decorative layer over it, or the application of conventional paint or wall coverings (e.g., wall paper) over it.

The support layer 180 may be formed from any of the binder or resin materials described above. The support layer may be formed from a solution or an emulsion and applied using any of the coating techniques described below. The support layer 180 may be extruded. The support layer 180 may contain one or more of the above-indicated pigments. In one embodiment, the support layer 180 contains sufficient pigment to provide it with a neutral color such as gray, light blue, light red, etc. The concentration of pigment in the support layer 180, when used, may range up to about 10% by weight, and in one embodiment about 6 to about 10% by weight.

The layers 110, 140 and 180 independently may contain inorganic fillers or other organic or inorganic additives to provide desired properties such as appearance properties (clear, opaque or colored films), durability and processing characteristics. Examples of useful materials include calcium carbonate, titanium dioxide, metal particles, fibers, flame retardants, antioxidant compounds, heat stabilizers, light stabilizers, ultraviolet light stabilizers, antiblocking agents, processing aids, acid acceptors, etc.

Nucleating agents may be added to one or more of the layers 110, 140 or 180 to increase crystallinity and thereby increase stiffness. The nucleating agents which may be used include mineral nucleating agents and organic nucleating agents. Examples of mineral nucleating agents include carbon black, silica, kaolin and talc. Examples of organic nucleating agents include salts of aliphatic mono-basic or di-basic acids or aryalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium betanaphtholate, lithium benzoate and aluminum tertiary-butyl benzoate also are useful organic nucleating agents. Substituted sorbitol derivatives such as bis (benzylidene) and bis (alkylbenzilidine) sorbitols wherein the alkyl groups contain from about 2 to about 18 carbon atoms are useful nucleating agents. Sorbitol derivatives such as 1,3,2,4-dibenzylidene sorbitol, 1,3,2,4-di-para-methylbenzylidene sorbitol, and 1,3,2,4-di-para-methylbenzylidene sorbitol may be used. The amounts of nucleating agent incorporated into the film forming formulations may range from about 100 to about 6000 ppm of the film. In one embodiment, the amount of nucleating agent may range from about 1000 to about 5000 ppm.

One or more of the layers 110, 140 or 180 may contain a minor amount of an adhesive resin to enhance the adhesion of the layer 110 to the layer 140 and/or 180. Also, or alternatively, tie layers of an adhesive resin can be positioned between the layers 110 and 140 or the layers 110 and 180. The adhesive resin can be an ethylene/vinyl acetate copolymer such as those available from DuPont under the tradename Elvax. The adhesive resins available from DuPont under the tradename Bynel may be used.

In one embodiment, the layers 110, 140 and/or 180 are non-stretchable and non-elastic at room temperature.

The adhesive layer 120 may comprise a pressure sensitive adhesive (PSA) layer, a moisture activatable adhesive layer or a heat activatable adhesive layer. The adhesive may comprise any pressure sensitive, moisture activatable or heat activatable adhesive known in the art for use with film substrates. The adhesive layer 120 may be in the form of a continuous or discontinuous layer, and may comprise one or a mixture of two or more adhesives. The adhesive layer may be in the form of a patterned adhesive layer with a relatively strong adhesive in some areas and a relatively weak adhesive in other areas. In one embodiment, the adhesive layer provides initial tack and allows slight movement of the laminate to allow positioning adjustments prior to forming a permanent bond. In one embodiment, the adhesive permits facilitated stripping of the dry paint film layer from a substrate when use of the paint film layer is no longer desired. In one embodiment, the adhesive layer is characterized by producing only a limited amount of ooze beyond the borders of the laminate when the laminate is applied to a substrate. In one embodiment, no ooze is produced. The adhesive may comprise a rubber based adhesive, acrylic adhesive, vinyl ether adhesive, silicone adhesive, or mixture of two or more thereof. The adhesive may be applied as a hot melt, solvent-based or water based adhesive. The adhesive materials that are useful may contain as a major constituent an adhesive polymer such as an acrylic-type polymer; block copolymer; natural, reclaimed, or styrene-butadiene rubber; tackified natural or synthetic rubber; a copolymer of ethylene and vinyl acetate; an ethylene-vinyl-acrylic terpolymer; polyisobutylene; poly (vinyl ether); etc. Other materials may be included in the adhesive such as tackifying resins, plasticizers, antioxidants, fillers, waxes, etc.

The adhesives may be classified into the following categories: random copolymer adhesives such as those based upon acrylate and/or methacrylate copolymers, a-olefin copolymers, silicone copolymers, chloroprene/acrylonitrile copolymers, and the like; block copolymer adhesives including those based upon linear block copolymers (i.e., A-B and A-B-A type), branched block copolymers, star block copolymers, grafted or radial block copolymers, and the like; and natural and synthetic rubber adhesives. A description of useful pressure-sensitive adhesives may be found in *Encyclopedia of Polymer Science and Engineering*, Vol.13. Wiley-Interscience Publishers (New York, 1988). Additional description of useful pressure-sensitive adhesives may be found in *Encyclopedia of Polymer Science and Technology*, Vol.1, Interscience Publishers (New York, 1964).

Pressure-sensitive adhesives that may be used include the hot melt pressure-sensitive adhesives available from H.B. Fuller Company, St. Paul, Minn. as HM-1597, HL-2207-X, HL-2115-X, HL-2193-X. Other useful pressure-sensitive adhesives include those available from Century Adhesives Corporation, Columbus, Ohio.

Conventional PSAs, including silicone-based PSAs, rubber-based PSAs, and acrylic-based PSAs are useful. Another commercial example of a hot melt adhesive is H2187-01, sold by Ato Findley, Inc., of Wauwatusa, Wis. In addition, rubber based block copolymer PSAs described in U.S. Pat. No. 3,239,478 (Harlan) also can be used, and this patent is hereby incorporated by a reference for its disclosure of such hot melt adhesives.

In one embodiment, the pressure sensitive adhesives comprise rubber based elastomer materials such as linear, branched, graft or radial block copolymers represented by the diblock structures A-B, the triblock A-B-A, the radial or coupled structures $(A-B)_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons which may be monocyclic or bicyclic in nature. The rubbery blocks or segments are typically polymer blocks of homopolymers or copolymers of aliphatic conjugated dienes. Rubbery materials such as polyisoprene, polybutadiene, and styrene butadiene rubbers may be used to form the rubbery block or segment. The rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes which may be utilized include any of those which exhibit elastomeric properties. The block copolymers may be diblock, triblock, multiblock, starblock, polyblock or graftblock copolymers. Throughout this specification and claims, the terms diblock, triblock, multiblock, polyblock, and graft or grafted-block with respect to the structural features of block copolymers are to be given their normal meaning as defined in the literature such as in the *Encyclopedia of Polymer Science and Engineering*, Vol.2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5.

Such block copolymers may contain various ratios of conjugated dienes to vinyl aromatic hydrocarbons including those containing up to about 40% by weight of vinyl aromatic hydrocarbon. Accordingly, multi-block copolymers may be utilized which are linear or radial symmetric or asymmetric and which have structures represented by the formulae A-B, A-B-A, A-B-A-B, B-A-B, $(AB)_{0,1,2}$ . . . BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390, 207; 3,598,887; and 4,219,627. As is well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene.

Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the conjugated diene portion generally is from about 10% to about 80%, and the vinyl content is preferably from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Examples of commercially available block copolymers useful as the adhesives in the present invention include those available from Shell Chemical Company and listed in the following Table II.

TABLE II

| Kraton | Type | Styrene/Rubber Ratio (w) | Melt Index |
|---|---|---|---|
| D1101 | Linear SBS | 31/69 | <1 |
| D1107P | Linear SIS | 15/85 | 11 |
| D1111 | Linear SIS | 22/78 | 3 |
| D1112P | Linear SIS | 15/85 | 23 |
| D1113P | Linear SIS | 16/84 | 24 |
| D1117P | Linear SIS | 17/83 | 33 |
| D1320X | Multi-arm $(SI)_n$ | 10/90 | NA |

Vector 4111 is an SIS block copolymer available from Dexco of Houston Tex.

Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Useful hydrogenated block copolymers include hydrogenated products of the block copolymers of styrene-isoprene-styrene such as a styrene-(ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). When the conjugated diene employed as isoprene, the resulting hydrogenated product resembles a regular copolymer block of ethylene and propylene (EP).

A number of selectively hydrogenated block copolymers are available commercially from Shell Chemical Company under the general trade designation "Kraton G." One example is Kraton G1652 which is a hydrogenated SBS triblock comprising about 30% by weight of styrene end blocks and a midblock which is a copolymer of ethylene and 1-butene (EB). A lower molecular weight version of G1652 is available from Shell under the designation Kraton G1650. Kraton G1651 is another SEBS block copolymer which contains about 33% by weight of styrene. Kraton G1657 is an SEBS diblock copolymer which contains about 13% w styrene. This styrene content is lower than the styrene content in Kraton G1650 and Kraton G1652.

In another embodiment, the selectively hydrogenated block copolymer is of the formula

$$B_n(AB)_oA_p$$

wherein: n=0 or 1; o is 1 to 100; p is 0 or 1; each B prior to hydrogenation is predominantly a polymerized conjugated diene hydrocarbon block having a number average molecular weight of about 20,000 to about 450,000; and each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

The block copolymers may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction between the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder.

Examples of commercially available maleated selectively hydrogenated copolymers of styrene and butadiene include Kraton FG1901X, FG1921X, and FG1924X from Shell, often referred to as maleated selectively hydrogenated SEBS copolymers. FG1901X contains about 1.7% w bound functionality as succinic anhydride and about 28% w of styrene. FG1921X contains about 1% w of bound functionality as succinic anhydride and 29% w of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

The adhesive compositions may contain at least one solid tackifier resin component. A solid tackifier is defined herein as one having a softening point above 80° C. When the solid tackifier resin component is present, the adhesive compositions may comprise from about 40 to about 80% by weight of a thermoplastic elastomer component and from about 20% to about 60% by weight, and in one embodiment from about 55 to about 65% by weight of a solid tackifier resin component. The solid tackifier reduces the modulus of the mixture sufficiently to build tack or adhesion. Also, solid tackifiers (particularly the higher molecular weight solid tackifiers (e.g., Mw greater than about 2000) and those having a lower dispersity (Mw/Mn=less than about 3)) may be less sensitive to migration into the polymerfilm layer, and this is desirable, since migration of tackifier into the film layer 110 or 180 may cause dimensional instability.

The solid tackifier resins include hydrocarbon resins, rosin, hydrogenated rosin, rosin esters, polyterpene resins, and other resins which exhibit the proper balance of properties. A variety of useful solid tackifier resins are available commercially such as terpene resins which are sold under the trademark Zonatac by Arizona Chemical Company, and petroleum hydrocarbons resins such as the resins sold under the trademark Escorez by Exxon Chemical Company. One particular example of a useful solid tackifier is Escorez 2596 which is a $C_5$–$C_9$ (aromatic modified aliphatic) synthetic tackifier having an Mw of 2100 and a dispersity (Mw/Mn) of 2.69. Another useful solid tackifier is Escorez 1310LC, identified as an aliphatic hydrocarbon resin having an Mw of 1350 and a dispersity of 1.8. Wingtack 95 is a synthetic tackifier resin available from Goodyear, Akron, Ohio consisting predominantly of polymerized structure derived from piperylene and isoprene.

The modulus of the adhesive mixtures to be coextruded also may be lowered by the incorporation of liquid rubbers, i.e., liquid at room temperature. The liquid rubbers generally will have an Mw of at least 5,000 and more often at least 20,000. Incorporation of liquid rubbers in amounts of less than 10%, and even less than 5% by weight based on the overall weight of the adhesive formulation results in adhesives which is coextrudable with the polymeric film materials. The incorporation of a liquid rubber may produce an adhesive having increased tack and adhesion. Liquid block copolymers such as liquid styrene-isoprene block copolymers may be used. Examples include Kraton LVSI-101, available from the Shell Chemical Company. Another example is a liquid polyisoprene obtained by depolymerization of high molecular weight polyisoprene. An example of a commercially available depolymerized high molecular weight polyisoprene is Isolene D-400 from Element is Performance Polymers, Belleville, N.J., and this liquid rubber has an Mw of about 20,000. Other liquid rubbers which may be incorporated into the adhesive mixture include liquid styrene-butadiene rubbers, liquid butadiene rubbers, ethylene-propylene rubbers, etc.

The adhesive layer 120 may contain one or more pigments to enhance the opacity of the paint film layers overlying it and permit the use of thinner paint film layers to achieve desired levels of opacity. Any of the pigments identified above may be used. Specific examples include titanium dioxide and carbon black. The pigment volume concentration may range up to about 10%, and in one embodiment from about 5 to about 10%, and in one embodiment about 2 to about 8%.

The adhesive compositions also may include other materials such as antioxidants, heat and light stabilizers, ultraviolet light absorbers, fillers, colorants, antiblocking agents, reinforcing agents, processing aids, etc. Hindered phenolic and amine antioxidant compounds may be included in the adhesive compositions, and a wide variety of such antioxidant compounds are known in the art. A variety of antioxidants are available from Ciba-Geigy under the general trade designations "Irganox" and "Irgafos". For example, the hindered phenolic antioxidant n-octadecyl 3-(3,5-di-t-butyl-4-hydroxyphenol)-proprionate is available under the general trade designation "Irganox 1076". Irganox 1010, is identified as Tetrakis (methylene 3-(3',5'-di-tert-butyl-4'-hydroxyphenol) proprionate) methane. Irgafos 168 is another useful antioxidant from Ciba-Geigy. Hydroquinone-based antioxidants also may be utilized, and one example of such an antioxidant is 2,5-di-tertiary-amyl-hydroquinone. Light stabilizers, heat stabilizers, and UV absorbers also may be included in the adhesive compositions. Ultraviolet absorbers include benzo-triazol derivatives, hydroxy benzyl phenones, esters of benzoic acids, oxalic acid, diamides, etc. Light stabilizers include hindered amine light stabilizers, and the heat stabilizers include dithiocarbamate compositions such as zinc dibutyl dithiocarbamate.

The adhesive compositions may contain inorganic fillers and other organic and inorganic additives to provide desired properties. Examples of useful fillers include calcium carbonate, titanium dioxide, metal particles, fibers, etc. An example of a useful end-block reinforcing agent is Cumar LX509 from Neville Resins.

The barrier layer 190 may comprise any of the acrylate polymers or copolymers described above, polyvinyl alcohol, copolymers derived from ethylene and vinyl acetate, and copolymers derived from ethylene, vinyl acetate and polyvinyl alcohol. The barrier layer may comprise a polymer blend derived from polyvinyl alcohol, urethane, Cymel 385 (a product of Cytec identified as a melamine formaldehyde resin) and a polyaziridine (e.g, NeoCryl CX100 which is identified as trimethol-tris N (methyl aziridinyl) proprionate and is available from Avecia Resins), the weight ratio of polyvinyl alcohol to urethane in one embodiment being about 20:80. The barrier layer may be provided to inhibit or reduce the migration of dyes or pigments and other materials from the substrate to which the inventive laminate is applied into the dry paint film layer 110. The following examples illustrate specific coating compositions which may be used in forming the barrier layer 190:

|  | Percent by weight |
|---|---|
| Barrier Layer No. 1 | |
| Elvacite 2042 (product of Ineos identified as an ethyl methacrylate copolymer) | 20 |
| Toluene | 48 |
| Methyl ethyl ketone | 32 |
| Barrier Layer No. 2 | |
| Adcote 61WG178 (product of Rohm and Haas identified as a solution of acrylic polymer) | 0.10 |
| Syloid 234 (product of Grace Davidson identified as synthetic amorphous silica) | |
| N-propanol | 44.35 |
| Barrier Layer No. 3 | |
| Adcote 61WG178 | 74.07 |
| N-propanol | 25.83 |
| Syloid 234 | 0.10 |
| Barrier Layer No. 4 | |
| Adcote 61WG178 | 55.55 |
| N-propanol | 44.35 |
| Syloid 234 | 0.10 |
| Desmodur CB 75N (product of Bayer identified as an oligomeric toluene diisocyanate) | 0.44 |
| Barrier Layer No. 5 | |
| Adcote 61WG178 | 74.07 |
| N-propanol | 25.83 |
| Syloid 234 | 0.10 |
| Desmodur CB 75N | 0.44 |
| Barrier Layer No. 6 | |
| Adcote 61WG178 | 58.0 |
| R-900 $TiO_2$ (product of DuPont identified as rutile titanium dioxide) | 15.00 |
| N-propanol | 24.0 |
| Isobutanol | 3.00 |
| Barrier Layer No. 7 | |
| Adcote 61WG178 | 58.00 |
| R-900 $TiO_2$ | 15.00 |
| N-propanol | 24.00 |
| Isobutanol | 3.00 |
| Desmodur CB 75N | 0.88 |
| Barrier Layer No. 8 | |
| Air Vol 523 (product of Air Products identified as polyvinyl alcohol) | 5.0 |
| Water | 47.5 |
| Isopropanol | 47.5 |

The backing liners 132 and 172 may independently comprise paper, polymer film, or a combination thereof. These backing liners, in one embodiment, are thermally stable, non-elastomeric and non-stretchable at room temperature. Paper liners are useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the backing liner. Thus, any type of paper can be used depending upon the end use and particular personal preferences. Included among the types of paper which can be used are clay coated paper, glassine, polymer coated paper, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight may be employed as a backing liner, paper having weights in the range of from about 30 to about 120 pounds per ream are useful, and papers having weights in the range of from about 60 to about 100 pounds per ream may be used. The term "ream" as used herein equals 3000 square feet.

Alternatively, the backing liners 132 and 172 may independently comprise a polymer film, and examples of polymer films include polyolefin, polyester, and combinations thereof. The polyolefin films may comprise polymer and copolymers of monoolefins having from 2 to about 12 carbon atoms, and in one embodiment from 2 to about 8 carbon atoms, and in one embodiment 2 to about 4 carbon atoms per molecule Examples of such homopolymers include polyethylene, polypropylene, poly-1-butene, etc. Films prepared from blends of copolymers or blends of copolymers with homopolymers may be used. The films may be extruded in mono or multilayers.

Another type of material which may be used as the backing liners 132 and 172 is a polycoated kraft liner which is basically comprised of a kraft liner that is coated on either one or both sides with a polymer coating. The polymer coating, which can be comprised of high, medium, or low density polyethylene, propylene, polyester, or other similar polymer films, is coated onto the substrate surface to add strength and/or dimensional stability to the liner. The weight of these types of liners ranges from about 30 to about 100 pounds per ream, with about 94 to about 100 pounds per ream being useful. In total, the final backing liner 132 may comprise from about 10% to about 40% polymer and from about 60% to about 90% paper. For two sided coatings, the quantity of polymer may be approximately evenly divided between the top and bottom surface of the paper.

The backing liners 132 and 172, in one embodiment, provide structural integrity to the laminate until they are removed upon application of the laminate to a substrate. As a result of the use of either or both of these liners, it is not necessary to employ a semi-rigid or reinforcing backing sheet with the inventive laminates.

The matte release coating layer 135 may comprise a single coat of release coating material or multiple coats. When multiple coats are used, each coat may have the same formulation, or different formulations may be used. The release coating layer 135 may comprise any of the above indicated binders or resins which provide sufficient tack or adherence between the release coating layer 135 and either the dry paint film layer 110 (FIG. 1 or 6-8), transparent film layer 140 (FIGS. 3–5) or printed decorative layer 165 (FIG. 9) to prevent separation of the release coating layer 135 from film layer 110, 140 or 165 during the making of the dry paint transfer laminate and normal handling of such laminate, and yet have sufficient release properties to provide for facilitated separation between the release coating layer 135 and the layers 110, 140 or 165 when using the laminate. The matte release coating layer 135 may comprise an alkyd resin and/or a vinyl resin cross linked with a melamine resin. The alkyd resins include resins formed by the condensation of one or more polyhydric alcohols with one or more polybasic acids or anhydrides. The polyhydric alcohols include glycerol and the polybasic acids or anhydrides include phthalic anhydride. Modified alkyds wherein the polybasic acid is substituted in part by a monobasic acid such as acrylic acid or a vegetable oil fatty acid may be used. The vinyl resins that may be used include polyvinyl chloride, polyvinyl acetate, copolymers of vinyl chloride and vinyl acetate, acrylic resins, methacrylic resins, polystyrene resins, and the like. The melamine resins include amino resins made by the condensation of melamine with formaldehyde or a compound capable of providing methylene bridges. The cross linking of the alkyd and/or vinyl resin with the melamine resin typically occurs when the matte release coating 135 is applied to the backing liner and dried or cured. In one embodiment, the release coating comprises on a solids basis from zero to about 80% by weight, and in one embodiment about 10 to about 30% by weight alkyd resin; from zero to about 80% by weight, and in one embodiment about 10 to about 30% by weight vinyl resin; and from about 10 to about 30% by weight, and in one embodiment about 20 to about 25% by weight melamine resin.

Matte release coating layer 135 contains one or more solid particulates that project into the surface 114 of dry paint film layer 110, the surface 141 of transparent film layer 140 or the printed decorative layer 165 to provide the layers 110, 140 or 165 with a matte or flat finish. The particulates that may be used may be any of the filler pigments described above for use in the paint film layers. Specific examples include talc and aluminum silicate. Particulates with irregular shapes (e.g., platelet shapes) may be used. By controlling the use of these particulates the surface finish of the dry paint film layer, transparent film layer or printed decorative layer may be controlled. For example, by using these particulates, the dry paint film layer, transparent film layer or printed decorative layer may be provided with a flat or semi-gloss finish. The paint film layer, transparent film layer or printed decorative layer may be provided with a relatively glossy finish by minimizing the use of these particulates. The weight ratio of particulates to resin or binder may range up to about 1.1:1, and in one embodiment about 0.7:1 to about 1.1:1, and in one embodiment from about 0.7:1 to about 0.9:1, and in one embodiment about 0.9:1 to about 1.1:1.

The release coating layers 136 and 176 may independently comprise any release coating composition known in the art. Silicone release coating compositions may be used. The silicone release coating compositions typically comprise polyorganosiloxanes such as polydimethylsiloxanes. The silicone release coating composition used in this invention may be room temperature cured, thermally cured, or radiation cured. Generally, the room temperature and thermally curable compositions comprise at least one polyorganosiloxane and at least one catalyst (or curing agent) for such polyorganosiloxane(s). These compositions may also contain at least one cure accelerator and/or adhesivity promoter. As is known in the art, some materials have the capability of performing both functions, i.e., the capability of acting as a cure accelerator to increase the rate, reduce the curing temperature, etc., and also as an adhesivity promoter to improve bonding of the silicone composition to the substrate. The use of such dual function additives where appropriate is within the purview of the invention.

In the embodiments illustrated in FIGS. 1–9, the release force required to separate release coating layer 135 from dry paint film layer 110, transparent film layer 140, or printed decorative layer 165 is advantageously greater than the release force required to separate release coating layer 136 from adhesive layer 120. In the embodiment illustrated in FIG. 6, the release force required to separate release coating layer 135 from dry paint film layer 110 is advantageously greater than the release force required to separate release coating layer 176 from adhesive layer 20.

In one embodiment, the release force required to separate release coating layer 135 from dry paint film layer 110, transparent film layer 140 or printed decorative layer 165 may be in the range of about 20 to about 180 grams per two inches (g/2 in), and in one embodiment 30 to about 150 g/2 in, and in one embodiment 40 to about 120 g/2 in, and in one embodiment 50 to about 100 g/2 in, and in one embodiment 50 to about 90 g/2 in, and in one embodiment about 70 to about 90 g/2 in, and in one embodiment about 50 to about 65 g/2 in. In one embodiment, the release force required to separate release coating layer 136 or 176 from adhesive layer 120 is in the range of 10 to about 150 g/2 in, and in one embodiment about 20 to about 150 g/2 in, and in one embodiment about 20 to about 90 g/2 in, and in one embodiment about 30 to about 150 g/2 in, and in one embodiment about 30 to about 100 g/2 in, and in one embodiment about 30 to about 70 g/2 in. The test method for determining these release forces involves measuring the force required to separate a two-inch wide release coated liner from the layer 110, 140 or 165, or from an adhesive coated substrate, with the release coated liner extending at an angle of 90° relative to the layer or substrate and being pulled at a rate of 300 inches per minute. The test may be conducted at room temperature.

Each of the layers 110, 120, 135, 136, 140, 176, 180 and 190 may be independently applied and dried and/or cured using known techniques. The application techniques include gravure, reverse gravure, offset gravure, roll coating, brushing, knife-over roll, metering rod, reverse roll coating, doctor knife, dipping, die coating, slot die coating, spraying, curtain coating, slide coating, slide curtain coating, extrusion, co-extrusion, flexographic, letter press, rotary screen, flat screen, and the like. In one embodiment, the adhesive layer 120 is a pressure sensitive adhesive layer and it may be applied using transfer lamination. The decorative layers 150, 160 and 165 may be applied using known printing techniques including gravure, flexographic, silk screen, ink jet, etc. The applied layers may be dried and/or cured by exposure to heat or to known forms of ionizing or actinic non-ionizing radiation. Drying or curing temperatures that may be used may range from about 115° C. to about 160° C., and in one embodiment about 140° C. to about 150° C. Useful types of radiation include ultraviolet light and electron beam. The equipment for generating these forms of thermal or radiation drying and/or curing are well known to those skilled in the art. One or more of the layers 110, 120, 140 and 180 may be extruded. The layers 110 and/or 180 may be coextruded with the adhesive layer 120. In one embodiment, the support layer 180 may be coextruded with the adhesive layer 120, and then the dry paint film layer 110 is coated (e.g., gravure) onto the support layer 180.

Each of the layers 110, 140 or 180 may independently comprise a single layer film or a multilayer film of two or more adjacent coextruded layers. For example, the layer 110, 140 or 180 may comprise one layer of a polyolefin and one layer of a blend of a polyolefin and a copolymer of ethylene and vinyl acetate (EVA). In one embodiment, the film layers 110, 140 or 180 may comprise three layers, a base or core layer of, for example, a polyolefin, and skin layers in both sides of the base or core layer which may comprise the same or different polymer blends.

Figure 11:
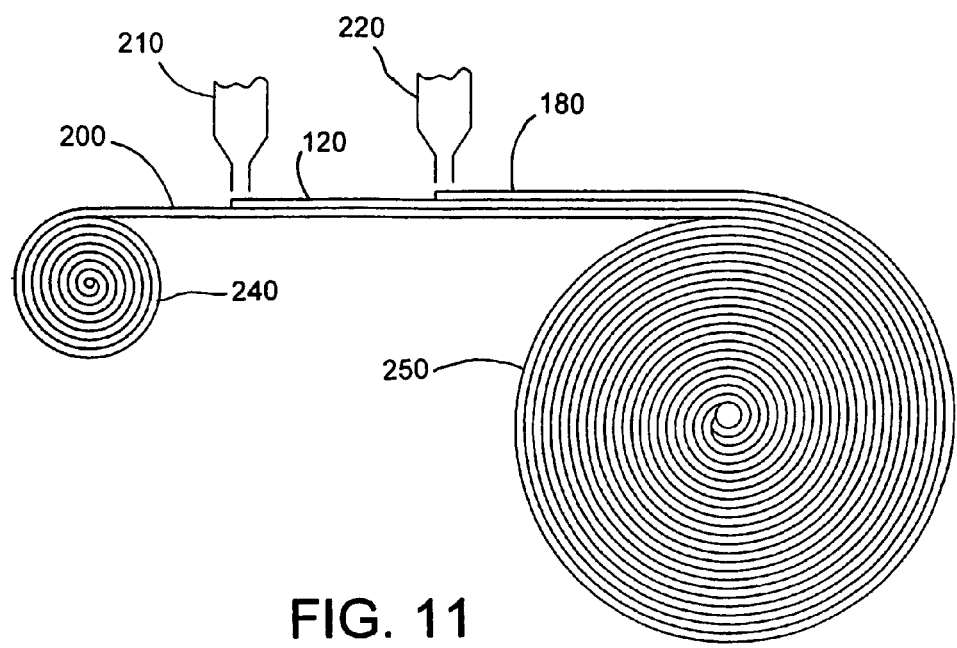
FIG. 11 is a schematic illustration of a process for coextruding the support layer and the adhesive layer used in one embodiment of the inventive laminate.
Figure 12:
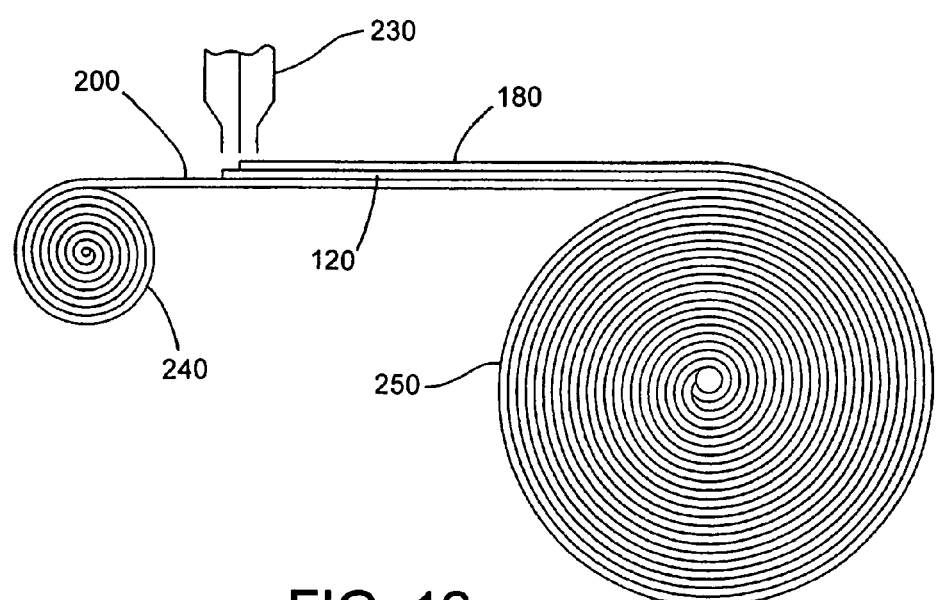
FIG. 12 is a schematic illustration of another embodiment of a process for coextruding the support layer and the adhesive layer used in one embodiment of the inventive laminate.

The dry paint film layer 110 or the support layer 180 may be coextruded with the adhesive layer 120 using separate extruders as illustrated in FIG. 11 or a dual die extruder as illustrated in FIG. 12. Referring to FIG. 11, release liner 200 is uncoiled from roll 240 and advanced past extrusion die 210 where it is coated with adhesive layer 120, and then past extrusion die 220 where the support layer 180 is coated onto the adhesive layer 120. The resulting coextrudate is collected in roll form as indicated by collection roll 250. Referring to FIG. 12, release liner 200 is advanced past dual extrusion die 230 which simultaneously coats release liner 200 with adhesive layer 120 and support layer 180. The resulting coextrudate is collected in roll form as indicated by collection roll 250. When a desired quantity of the coextrudate has been manufactured, the collection roll 250 is removed from the process and is stored for subsequent processing (e.g., coating, printing, etc.) during a separate operation at either the same or at a different geographic location, thereby providing enhanced manufacturing flexibility. Alternatively, rather than being collected, the coextrudate may be routed for coating, printing, etc., during the same manufacturing operation. The dry paint film layer 110 may be coextruded with the adhesive layer 120 following the above procedure. Multi-die application methods useful for applying both a pressure sensitive adhesive and a film forming layer to a substrate are further described in Published PCT International Application Nos. PCT/US95/11807; PCT/US95/11733; PCT/US95/11734; and PCT/US95/11717, which are herein incorporated by reference. The polymeric film materials and adhesive compositions that are coextruded may be neat, or they may be emulsions or solvent-based. Emulsion and solvent-based acrylic based PSAs are known and described in, for example, U.S. Pat. Nos. 5,639,811 and 5,164,444, respectively, and these patents are hereby incorporated by reference for such disclosures. When emulsions of the film materials and/or adhesive compositions are used, the water may be removed in an extruder by using the process described and claimed in U.S. Pat. No. 5,716,669 (LaRose et al). In one embodiment, the film materials and adhesives which are coextruded are compositions substantially free (e.g., less than about 1% by weight) of water and/or solvents. The presence of water or solvents during the coextrusion process may result in pinholes and bubbles in the coextruded film. The presence of voids in the film due to steam may be referred to as "moisture slits."

When the polymeric film material and adhesive are coextruded, the hot melt viscosity of the polymeric film material and the adhesive may be within a window or range of viscosities which may produce a coextrudate of continuous and uniform layers of the polymeric film material and the adhesive in order to avoid film defects and intermingling of the polymeric film material and the adhesive during the coextrusion process. The polymeric film material may have a hot melt viscosity that is within a factor of from about 0.07 to about 15 times the hot melt viscosity of the adhesive at the shear rates incurred during the coextrusion process. The shear rates may range from about 100 sec$^{-1}$ to about 10,000 sec$^{-1}$. The factor may be from about 1 to about 15, and in one embodiment about 1 to about 10. It is also desirable for the polymeric film material and the adhesive to have relatively similar melt viscosities at the extrusion temperatures. For example, when the adhesive is a conventional hot melt adhesive, the extrusion temperatures of the adhesive may be in the range of from about 150° C. to about 200° C., and in one embodiment in the range of from about 175° C. to about 200° C. The polymeric film material selected for use with the adhesive may have an extrusion temperature below about 200° C., and in one embodiment in the range of from about 150° C. to about 180° C.

The dry paint transfer laminate 100 illustrated in FIG. 1 may be made by applying release coating 136 to lower surface 134 of backing liner 132 using one of the foregoing application techniques and then curing the release coating. The coat weight for the release coating layer 136 may be in the range of about 0.1 to about 1 gram per square meter (gsm), and in one embodiment about 0.25 to about 0.35 gsm. Release coating layer 135 is then applied to upper surface 133 of backing liner 132 using one of the above indicated application techniques (e.g, gravure) and then dried or cured. The coat weight for the release coating 135 may range from about 2.5 to about 6.5 gsm, and in one embodiment about 4.5 to about 5.5 gsm. The liquid paint or coating composition for forming dry paint film layer 110 is then applied to the surface of release coating layer 135 using one of the above indicated application techniques (e.g., reverse roll or slot die) and then dried or cured. The coat weight for the dry paint film layer 110 may range from about 20 to about 60 gsm, and in one embodiment about 30 to about 40 gsm. One or more coats may be applied. Pressure sensitive adhesive layer 120 is then applied to upper surface 112 of dry paint film layer 110 using one of the above indicated application techniques (e.g., slot die) and then dried or cured. The pressure sensitive adhesive may be applied using transfer lamination. The coat weight for the pressure sensitive adhesive layer 120 may range from about 10 to about 30 gsm, and in one embodiment about 11 to about 17 gsm. The dry paint transfer laminate 100 may then be wound into roll form as illustrated in FIG. 2 using known techniques.

The dry paint transfer laminate 100A illustrated in FIG. 3 may be made using the same procedure used for making the laminate 100 except that transparent film layer 140 is applied to the surface of release coating layer 135 and then dried or cured prior to the application of the dry paint film layer 110. The dry paint film layer 110 is then applied to the surface of the transparent film layer 140. The transparent film layer 140 may be applied using one of the foregoing application techniques (e.g., gravure). The coat weight for the transparent film layer 140 may range from about 1 to about 5 gsm, and in one embodiment about 2.5 to about 3.5 gsm. One or more coats may be applied. The dry paint transfer laminate 100A may then be wound into a roll as illustrated in FIG. 2 using known techniques.

The dry paint transfer laminate 100B illustrated in FIG. 4 may be made using the same procedure used for making the laminate 100A except that the liquid paint composition for forming the printed decorative layer 150 is applied to the surface of the transparent film layer 140 and then cured prior to the application of the dry paint film layer 110. The dry paint film layer 110 is then applied to the surface of the printed decorative layer 150. The printed decorative layer 150 may be applied using any of the foregoing printing techniques (e.g., gravure, flexographic, silk screen, ink jet, etc.). The coat weight for the printed decorative layer 150 may range from about 0.3 to about 2 gsm, and in one embodiment about 0.3 to about 0.7 gsm. The dry paint transfer laminate 100B may then be wound into a roll as illustrated in FIG. 2 using known techniques.

The dry paint transfer laminate 100C illustrated in FIG. 5 may be made using the same procedure used for making the laminate 100B except that the liquid paint composition for forming the second printed decorative layer 160 is applied to the surface of the transparent film layer 140 and then dried or cured prior to the application of the printed decorative layer 150. The printed decorative layer 150 is then applied over the surface of the second printed decorative layer 160. The second printed decorative layer 160 may be applied using any of the foregoing printing techniques (e.g., gravure, flexographic, silk screen, ink jet, etc.). The coat weight for the second printed decorative layer 160 may range from about 0.3 to about 2 gsm, and in one embodiment about 0.3 to about 0.7 gsm. The dry paint transfer laminate 100C may then be wound into a roll as illustrated in FIG. 2 using known techniques.

The dry paint transfer laminate 100D illustrated in FIG. 6 may be made using the same procedure used for making the laminate 100 illustrated in FIG. 1 except that release liner 170 is adhered to adhesive layer 120 with release coating layer 176 in contact with adhesive layer 120.

The dry paint transfer laminate 100E illustrated in FIG. 7 may be made using the same procedure used for making the laminate 100 illustrated in FIG. 1 except that the support layer 180 is adhered to the dry paint film layer 110. The support layer 180 may be coextruded with the adhesive layer 120 and then the dry paint film layer 110 may be coated (e.g., gravure) onto the support layer 180. The dry paint transfer laminate 100E may then be wound into a roll as illustrated in FIG. 2 using known techniques.

The dry paint transfer laminate 100F illustrated in FIG. 8 may be made using the same procedure used for making the laminate 100 illustrated in FIG. 1 except the the barrier layer 190 is coated on the dry paint transfer film layer 110. The dry paint transfer laminate 100F may then be wound into a roll as illustrated in FIG. 2 using known techniques.

The dry paint transfer laminate 100G illustrated in FIG. 9 may be made using the same procedure used for making the laminate 100 illustrated in FIG. 1 except that support layer 180 is adhered to dry paint transfer layer 110. The support layer 180 may be coextruded with the adhesive layer 120. The printed decorative layers 150, 160 and 165 may be coated sequentially over the dry paint film layer 110. The dry paint transfer laminate 100G may then be wound into a roll as illustrated in FIG. 2 using known techniques.

The dry paint transfer laminate 100H illustrated in FIG. 10 may be made using the same procedure used for making the laminate 100C illustrated in FIG. 5 except that the release liner used in the laminate 100C is removed, and the release liner 170 and accompanying release layer are included. The dry paint film layer 110 and adhesive layer 120 may be coextruded onto the release layer 176 of the release liner 170.

The inventive dry paint transfer laminate may be made in a single production line or in multiple production lines or multiple production facilities. With multiple production lines or facilities, part of the laminate may be produced as a roll laminate, dried or cured, rolled up, transferred to the next production line or facility, unrolled, and further treated with the application of additional layers. For example, the dry paint film layer 110 and the adhesive layer 120 may be deposited in multiple lines, or they may be deposited in sequence in a single line, or they may be deposited simultaneously such as by coextrusion or multi-die coating methods. Production in a single production line may be more efficient by avoiding extra handling, storage, and transporting steps for what may comprise, at least in one embodiment, relatively thin and delicate film materials.

The dry paint transfer laminate 100 may be used by unrolling the laminate from the roll illustrated in FIG. 2, and simultaneously applying the laminate to the substrate (e.g., wall) to be covered. The substrate may comprise any flat surface. The flat surface may comprise wall board, plastic sheet, metal sheet, composites, and the like. The substrate may comprise an interior (i.e., indoor) surface or an exterior (i.e., outdoor) surface. The laminate is placed over the substrate with the adhesive layer 120 in contact with the substrate. The release liner 130 is then peeled off leaving the dry paint film layer 110 adhered to the substrate by the adhesive layer 120. An advantage of using this laminate, at least in one embodiment, is that it is possible to overlap part of the applied dry paint film layer with the next adjacent applied dry paint film layer due to the fact that the seams substantially disappear and therefore are not noticeable. This advantage is provided at least in part due to the fact that the dry paint film layer 110 is relatively thin. Also, the gloss and opacity of the dry paint film layer 110 contribute to this ability to hide seems.

The dry paint transfer laminate 100A may be applied to a substrate in the same manner as the laminate 100. When the release liner 130 is peeled off, the dry paint film layer 110, transparent film layer 140, and adhesive layer 120 remain adhered to the substrate with the adhesive layer 120 in contact with the substrate.

The dry paint transfer laminate 100B may be applied to a substrate in the same manner as the laminate 100. When the release liner 130 is peeled off, the dry paint film layer 110, printed decorative layer 150, transparent film layer 140, and adhesive layer 120 remain adhered to the substrate with the adhesive layer 120 in contact with the substrate.

The dry paint transfer laminate 100C may be applied to a substrate in the same manner as the laminate 100. When the release liner 130 is peeled off, the layers 110, 150 and 160, transparent film layer 140, and adhesive layer 120 remain adhered to the substrate with the adhesive layer 120 in contact with the substrate.

The dry paint transfer laminate 100D may be applied to a substrate in the same manner as the laminate 100 except that the laminate is advantageously provided in the form of a flat sheet rather than a roll and the release liner 170 is peeled off before the adhesive layer 120 is adhered to the substrate.

The dry paint transfer laminate 100E may be applied to a substrate by adhering the adhesive layer 120 to the substrate, and then removing the release liner 130.

The dry paint transfer laminate 100F may be applied to a substrate by adhering the adhesive layer 120 to the substrate, and removing the release liner 130.

The laminate 100G may be applied to a substrate by adhering the adhesive layer 120 to the substrate, and removing the release liner 130.

The laminate 100H may be applied to a substrate by peeling the peeling the release liner 170 and accompanying release coating 176 from the laminate, and then applying the adhesive layer 120 to the substrate. The laminate may be applied using a specialized applicator which winds or coils the release liner 170 and accompanying release layer 176 as the remainder of the laminate is applied to the substrate.

EXAMPLES 1 AND 2

A polyethylene terephthalate film backing liner corresponding to backing liner 132 is coated on one side with a silicone release coating corresponding to second release coating layer 136. The thickness of the release coated liner is 0.92 mil.

A matte release coat corresponding to first release coating layer 135 is applied to the other side of the backing liner using gravure at a coat weight of 6.5–7.75 gsm. The formulation for the matte release coat is as follows: 26% by weight methylisobutyl ketone, 6% by weight isopropanol, 34.8% by weight Lankyd 13-1425 (a product supplied by Akzo Resins identified as an acrylic modified alkyd), 2.6% by weight Elvacite 2042 (a product supplied by Lucite International identified as a polyethyl methacrylate polymer), 30% by weight Microtalc MP 15-38 (a product supplied by Barrett's Minerals identified as a talc extender pigment), 2.5% by weight Cycat 4040 (a product supplied by Cytec identified as paratoluene sulfonic acid) and 8.7% by weight Cymel 303 (a product suppled by Cytec identified as a melamine resin). The matte release coat is dried using forced hot air at a temperature of 149° C.

A transparent film layer corresponding to transparent film layer 140 is applied to the matte release coat using gravure at a coat weight of 2.7–2.9 gsm and dried using forced hot air at a temperature of 120° C. The formulation for the transparent film layer is as follows: 46.7% by weight methyl ethyl ketone, 31.3% by weight toluene, 11% by weight VYNS (a product of Union Carbide identified as a vinyl chloride/vinyl acetate copolymer containing 5–20% by weight vinyl acetate), and 11% by weight Vitel 2200B (a product of Bostic identified as a polyester copolymer).

The following paint compositions are used to form a dry paint film layer corresponding to dry paint film layer 110 on the transparent film layer, one for Example 1 and the other for Example 2. Example 1 has a deep brown tone, while Example 2 has an orange pastel tone. In the following table, all numerical values are in parts by weight.

|  | Example 1 | Example 2 |
| --- | --- | --- |
| Methylethyl ketone | 66.7 | 66.7 |
| Toluene | 33.3 | 33.3 |
| VYHH (product of Union Carbide identified as a vinyl chloride/vinyl acetate copolymer) | 50.05 | 30.55 |
| Edinol 9790 (a product of Cognis identified as a polyester plasticizer) | 24.65 | 15.05 |
| Yellow pigment 42 (iron oxide) | 17.8 | 2.3 |
| Orange pigment 36 (monoazo benzimidazoline) | 2.5 | 0.38 |
| Black 7 (carbon black) | 0.1 | 0.02 |
| White 6 (titanium dioxide) | 4.9 | 51.7 |

The pigment volume ratio for Example 1 is 10%, and for Example 2 it is 27%. The above paint formulations are applied to the transparent film layer using a reversed roller coater and dried at a temperature of 135° C. to drive off the solvents. The dry film thickness of each of the dry paint film layers is 0.7 mil.

A pigmented pressure sensitive adhesive is then applied to the dry paint film layer at a coat weight of 14–20 gsm using transfer lamination to provide an adhesive layer corresponding to pressure sensitive adhesive layer 120. The formulation for the pressure sensitive adhesive is as follows: 70–90% by weight 2-ethylhexal acrylate, 1–10% by weight acrylic acid, 10–20% by weight methyl acrylate, 3.7% UCD 1106E (a product of Rohm and Haas identified as a titanium dioxide dispersion concentrate), and 0.3% by weight of UCD 1507E (a product of Rohm and Haas identified as a carbon black dispersion concentrate).

EXAMPLE 3

The procedure used for Examples 1 and 2 is repeated except that the following liquid paint composition is used to form the dry paint film layer corresponding to dry paint film layer 110. In the following table, all numerical values are in parts by weight.

| Methylethyl ketone | 29.6 |
| --- | --- |
| Toluene | 19.5 |
| Vitel 2200 B | 11.6 |

-continued

| Vitel 2650 (product of Bostic identified as a polyester copolymer) | 11.5 |
| --- | --- |
| R-900 (product of DuPont identified as titanium dioxide) | 27.5 |
| 955-39230 (product of Gibraltar Chemical Works identified as shading black) | 0.2 |
| 99-34520 (product of Gibraltar Chemical Works identified as phthalo blue GS) | 0.1 |
| 955-37470 (product of Gibraltar Chemical Works identified as carbazole violet) | tint |

The foregoing paint composition has a light blue color. The dry film thickness of the dry paint film layer is 0.6–0.8 mil.

EXAMPLE 4

A polyethylene terphthalate film backing liner corresponding to backing liner 132 is coated on one side with a silicone release coating corresponding to second release coating layer 136. The thickness of the release coated liner is 0.92 mil.

A matte release coat corresponding to first release coating layer 135 is applied to the other side of the backing liner using gravure at a coat weight of 4.4–4.6 gsm. The formulation for the matte release coat is as follows: 50.54% by weight methylisobutyl ketone, 7.84% by weight isopropanol, 8.93% by weight Lankyd 13-1425, 10.68% by weight VAGH (product of Union Carbide identified as hydroxy modified polyvinyl chloride/polyvinyl acetate copolymer), 22% by weight Microtalc MP 15-38, 2% by weight Cycat 4040, and 6.8% by weight Cymel 303. The matte release coat is dried using forced hot air at a temperature of 149° C.

A first coat of a transparent film layer corresponding to transparent film layer 140 is applied to the matte release coat using gravure at a coat weight of 1.3–2 gsm and dried using forced hot air at a temperature of 120° C. The dry film thickness is 0.05–0.1 mil. The formulation for this first transparent film layer coat is as follows: 41.5% by weight methyl ethyl ketone, 41.5% by weight methyl isobutyl ketone, and 17% by weight Elvacite 2042 (a product of Lucite International identified as a polymethyl methacrylate).

A second coat of a transparent film layer corresponding to transparent film layer 140 is applied over the first coat of transparent film layer using gravure at a coat weight of 1.0–1.5 gsm and dried using forced hot air at a temperature of 120° C. The dry film thickness is 0.03–0.7 mil. The formulation for this second transparent film layer coat is as follows: 41.5% by weight methyl ethyl ketone, 41.5% by weight methyl isobutyl ketone, and 17% by weight VYHH (a product of Union Carbide identified as a vinyl chloride/vinyl acetate copolymer containing 5–20% by weight vinyl acetate).

A decorative layer corresponding to second printed decorative layer 160 is printed over the second coat of the transparent coating layer at a coat weight of 3.0–3.2 gsm and dried in hot air at a temperature of 120° C. The paint composition used for this decorative layer has the following formulation (all numerical values are in parts by weight):

| Methylethyl ketone | 42.6 |
| --- | --- |
| Methyl isobutyl ketone | 38.7 |
| VYHH | 15.86 |

-continued

| | |
|---|---|
| DP 80110 (product of Gibraltar Chemical Works identified as containing methylethyl ketone, toluene, carbon black and acrylic polymer) | 2.1 |
| DP 36640 (product of Gibraltar Chemical Works identified as containing methyl ethyl ketone, toluene, quinacridone red, and acrylic polymer) | 0.22 |
| I8977 (product of Gibraltar Chemical Works identified as containing methyl ethyl ketone, toluene, R.S. Phthalo Blue, and acrylic polymer) | 0.10 |
| I8980 (product of Gibraltar Chemical Works identified as containing methyl ethyl ketone, toluene, isoindolinone yellow and acrylic polymer) | 0.38 |

A decorative layer corresponding to printed decorative layer 150 is printed over the above indicated decorative layer corresponding to second printed decorative layer 160 at a coat weight of 0.8 gsm and dried in hot air at a temperature of 120° C. The paint composition used for this decorative layer has the following formulation (all numerical values are in parts by weight):

| | |
|---|---|
| Methylethyl ketone | 42.85 |
| Methyl isobutyl ketone | 39.1 |
| VYHH | 16.0 |
| DP 80110 | 1.71 |
| DP 36640 | 0.18 |
| I8977 | 0.18 |

The following paint composition is coated over the above indicated decorative layer corresponding to printed decorative layer 150 at a coat weight of 30–32 gsm and dried in hot air at a temperature of 120° C. to provide a dry paint film layer corresponding to dry paint film layer 110. In the following table, all numerical values are in parts by weight.

| | |
|---|---|
| Methyl ethyl ketone | 34 |
| Toluene | 16.7 |
| VYHH | 18.3 |
| Edinol 9790 | 9 |
| AVI-0301-3 Orange (product of Gibraltar Chemical Works identified as containing methyl ethyl ketone, toluene, diarylide orange, VYHH and Edinol 9790) | 8.9 |
| AVI-0301-5 Magenta (product of Gibraltar Chemical Works identified as containing methyl ethyl ketone, toluene, Metal Azo Red, VYHH and Edinol 9790) | 5.3 |
| AVI-0301-6 Iron Red (product of Gibraltar Chemical Works identified as containing methyl ethyl ketone, toluene, Iron Oxide Red, VYHH and Edinol 9790) | 3.7 |
| AVI-0301-1 TiO$_2$ White (product of Gibraltar Chemical Works identified as containing methyl ethyl ketone, toluene, titanium dioxide, VYHH and Edinol 9790) | 3.52 |
| AVI-0301-2 Carbon Black (product of Gibraltar Chemical Works identified as containing methyl ethyl ketone, toluene, carbon black, VYHH and Edinol 9790) | 0.03 |

A pigmented pressure sensitive adhesive is then applied over the dry paint film layer corresponding to dry paint film layer 110 at a coat weight of 17 gsm using transfer lamination to provide an adhesive layer corresponding to pressure sensitive adhesive layer 120. The formulation for the pressure sensitive adhesive is as follows: 96% by weight of a non-tackified acrylic emulsion containing a crosslinked copolymer of butyl acrylate and ethyl hexyl acrylate, 3.7% by weight UCD 1106E, and 0.3% by weight UCD 1507E.

EXAMPLE 5

A polyethylene terphthalate film backing liner corresponding to backing liner 132 is coated on one side with a silicone release coating corresponding to second release coating layer 136. The thickness of the release coated liner is 0.92 mil.

A matte release coat corresponding to first release coating layer 135 is applied to the other side of the backing liner using gravure at a coat weight of 4.4–4.6 gsm. The matte release coat is dried using forced hot air at a temperature of 149° C. The formulation for the matte release coat is as follows (all numerical values are in parts by weight):

| | |
|---|---|
| Methyl isobutyl ketone | 52.54 |
| Elvacite 4402 (product of Lucite International identified as hydroxy ethyl methacrylate modified acrylic resin) | 20.98 |
| VYNS | 1.35 |
| Microtalc 15-38 | 22.85 |
| Byk 451 (product supplied by Byk Chemie identified as blocked acid catalyst) | 2.2 |
| Cymel 303 | 6.38 |

A transparent film layer corresponding to transparent film layer 140 is applied to the matte release coat using a reverse roll coater at a coat weight of 13 gsm and dried using forced hot air at a temperature of 120° C. The dry film thickness is 0.4 mil. The formulation for the transparent film layer coat is as follows (all numerical values are in parts by weight):

| | |
|---|---|
| Rucothane CO-A-5002L (product of Ruco Chemical identified as polyester urethane) | 62.5 |
| Toluene | 18.75 |
| Isopropanol | 18.75 |

A decorative layer corresponding to printed decorative layer 150 is printed over the above indicated transparent film layer at a coat weight of 1 gsm and dried in hot air at a temperature of 120° C. The paint composition used for this decorative layer has the following formulation (all numerical values are in parts by weight):

| | |
|---|---|
| Methyl ethyl ketone | 25.67 |
| Methyl isobutyl ketone | 22.0 |
| VYHH | 9.17 |
| I8980 | 3.5 |
| DP 37251 (product of Gibraltar Chemical Works identified as containing perylene red, methyl ethyl ketone, toluene and acrylic polymer) | 0.99 |
| DP80110 | 1.0 |
| DP39600 (product of Gibraltar Chemical Works identified as containing TiO$_2$, methyl ethyl ketone, toluene and acrylic polymer) | 37.47 |
| I8977 | 0.20 |

The following paint composition is coated over the above indicated decorative layer corresponding to printed decorative layer 150 at a coat weight of 66 gsm and dried in hot air at a temperature of 138° C. to provide a dry paint film layer corresponding to dry paint film layer 110. In the following table, all numerical values are in parts by weight:

| | |
|---|---|
| Methyl isobutyl ketone | 24.11 |
| Toluene | 20.65 |
| VYHH | 11.54 |
| R-900 | 38.4 |
| Acroloid B-72 (product of Rohm and Haas identified as an acrylic resin) | 3.86 |
| I8980 | 2.6 |
| DP37251 | 0.21 |
| DP80110 | 0.40 |

A pressure sensitive adhesive is then applied over the dry paint film layer corresponding to dry paint film layer 110 at a coat weight of 15–20 gsm using transfer lamination to provide an adhesive layer corresponding to pressure sensitive adhesive layer 120. The pressure sensitive adhesive is a non-tackified acrylic emulsion. The formulation for the pressure sensitive adhesive is as follows: 70–90% by weight 2-ethylhexal acrylate, 1–10% by weight acrylic acid, and 10–20% by weight methyl acrylate.

EXAMPLE 6

A polyethylene terphthalate film backing liner corresponding to backing liner 132 is coated on one side with a silicone release coating corresponding to second release coating layer 136. The thickness of the release coated liner is 0.92 mil.

A matte release coat corresponding to release coating layer 135 is applied to the other side of the backing liner using gravure. The release coat is dried using forced hot air at a temperature of 148.9° C. The matte release coat is applied at a coat weight of 4.0–5.0 gsm. The formulation for the matte release coat is as follows (all numerical values are in parts by weight):

| | |
|---|---|
| Methyl isobutyl ketone | 42.03 |
| Isopropanol | 8.51 |
| Microtalc 15-38 | 23.87 |
| Cymel 303 | 7.36 |
| Cycat 4040 | 1.8 |
| VROH (product supplied by Union Carbide identified as a vinyl chloride/vinyl acetate copolymer with OH functionality) | 16.43 |

A transparent film layer corresponding to transparent film layer 140 is applied over Matte Release Coat No. 2 using a 2 mil byrd bar at a coat weight of 30 gsm and dried using hot air at a temperature of 126.7° C. The formulation for the transparent film layer is as follows (all numerical values are in party by weight):

| | |
|---|---|
| Water | 7.98 |
| N-methyl pyrrolidone | 4.79 |
| Texanol (product of Eastman Chemicals identified as an ester alcohol) | 4.79 |
| BYK 333 (product of Byk Chemie identified as a wetting agent) | 0.4 |
| Vycar 351 (product of Noveon identified as a polyvinyl chloride copolymer emulsion) | 79.81 |
| Antifoam PD-218 (product of Magrabar Chemical identified as an antifoam agent) | 0.32 |
| Rheolate 350 (product of Rheox, Inc. identified as a thickener) | 1.92 |

The following paint composition is coated over the above indicated transparent film at a coat weight of 96 gsm and dried in hot air at a temperature of 126.7° C. to provide a dry paint film layer corresponding to dry paint film layer 110. In the following table, all numerical values are in parts by weight:

| | |
|---|---|
| Water | 18.28 |
| Surfynol CT-324 (product of Air Products identified as a surfactant) | 0.98 |
| R-900 | 32.88 |
| Vycar 460X45 (product of Noveon identified as a vinyl chloride/acrylic copolymer) | 34.72 |
| Vycar 460X46 (product of Noveon identified as a vinyl chloride/acrylic copolymer) | 11.57 |
| Antifoam PD-218 | 0.19 |
| Byk 333 | 0.23 |
| Rheolate 350 | 1.2 |

A pressure sensitive adhesive is then applied over the dry paint film layer corresponding to dry paint film layer 110 at a coat weight of 17 gsm using transfer lamination to provide an adhesive layer corresponding to pressure sensitive adhesive layer 120. The formulation for the pressure sensitive adhesive is as follows: 96% by weight of a non-tackified emulsion containing a crosslinked copolymer of butyl acrylate and ethyl hexyl acrylate, 3.7% by weight UCD 1106E, and 0.3% by weight UCD 1507E.

EXAMPLE 7

A polyethylene terphthalate film backing liner corresponding to backing liner 132 is coated on one side with a silicone release coating corresponding to second release coating layer 136. The thickness of the release coated liner is 0.92 mil.

A matte release coat corresponding to first release coating layer 135 is applied to the other side of the backing liner using gravure at a coat weight of 4.4–4.6 gsm. The formulation for the matte release coat is as follows: 50.54% by weight methylisobutyl ketone, 7.84% by weight isopropanol, 8.93% by weight Lankyd 13–1425, 10.68% by weight VAGH (product of Union Carbide identified as hydroxy modified polyvinyl chloride/polyvinyl acetate copolymer), 22% by weight Microtalc MP 15–38, 2% by weight Cycat 4040, and 6.8% by weight Cymel 303. The matte release coat is dried using forced hot air at a temperature of 149° C.

A transparent film layer corresponding to transparent film layer 140 is applied to the matte release coat using gravure at a coat weight of 12–16 gsm and dried using forced hot air at a temperature of 165° C. The dry film thickness is 0.35–0.5 mil. The formulation for this transparent film layer is as follows (all numerical values are in parts by weight)

| | |
|---|---|
| Cyclohexanone | 69.3 |
| Elvacite 2042 | 10.5 |
| Solsperse 17000 (product of Avecia identified as a wetting agent) | 0.1 |
| Tinuvin 234 (product of Ciba identified as a light stabilizer) | 0.6 |
| Kynar 301F (product of Atofina identified as a polyvinyl fluoride homopolymer) | 27.0 |
| N-methyl-2-pyrrolidone | 2.5 |

A decorative layer corresponding to second printed decorative layer 160 is printed over the transparent coating layer at a coat weight of 0.3–1.2 gsm and dried in hot air at a temperature of 105° C. The paint composition used for this decorative layer has the following formulation (all numerical values are in parts by weight):

| | |
|---|---|
| Methylethyl ketone | 36.0 |
| Methyl propyl ketone | 35.1 |
| Kynar 7201 (SL) (product of Atofina identified as a polyvinyl fluoride copolymer) | 10.2 |
| Elvacite 2010 (product of Lucite International identified as a polymethyl methacrylate) | 3.4 |
| Tinuvin 234 | 0.27 |
| DP35740 (product of Gibraltar Chemical Works identified as a buff mixed metal oxide pigment concentrate) | 0.10 |
| DP35820 (product of Gibraltar Chemical Works identified as a brown mixed metal oxide pigment concentrate) | 11.7 |
| DP39040 (product of Gibraltar Chemical Works identified as a black mixed metal oxide pigment concentrate) | 3.3 |

A decorative layer corresponding to printed decorative layer 150 is printed over the above indicated decorative layer corresponding to second printed decorative layer 160 at a coat weight of 0.3–1.2 gsm and dried in hot air at a temperature of 105° C. The paint composition used for this decorative layer has the following formulation (all numerical values are in parts by weight):

| | |
|---|---|
| Methylethyl ketone | 34.0 |
| Methyl propyl ketone | 33.0 |
| Kynar 7201 (SL) | 9.6 |
| Elvacite 2010 | 3.2 |
| Tinuvin 234 | 0.25 |
| DP35740 | 14.4 |
| DP35820 | 5.0 |
| DP39040 | 3.2 |

The following paint composition is coated over the above indicated decorative layer corresponding to printed decorative layer 150 at a coat weight of 6–10 gsm and dried in hot air at a temperature of 105° C. to provide a dry paint film layer corresponding to dry paint film layer 110. In the following table, all numerical values are in parts by weight.

| | |
|---|---|
| Methyl ethyl ketone | 27.6 |
| Methyl propyl ketone | 26.3 |
| Kynar 7201 (SL) | 7.4 |
| Elvacite 2010 | 2.5 |

-continued

| | |
|---|---|
| Tinuvin 234 | 0.2 |
| DP35740 | 4.1 |
| DP35820 | 7.8 |
| DP39040 | 0.6 |
| DP39600 (product of Gibralter Chemical Works identified as a white titanium dioxide pigment concentrate) | 23.6 |

A pigmented pressure sensitive adhesive is then applied over the dry paint film layer corresponding to dry paint film layer 110 at a coat weight of 17 gsm using transfer lamination to provide an adhesive layer corresponding to pressure sensitive adhesive layer 120. The formulation for the pressure sensitive adhesive is as follows: 96% by weight of a non-tackified acrylic emulsion containing a crosslinked copolymer of butyl acrylate and ethyl hexyl acrylate, 3.7% by weight UCD 1106E, and 0.3% by weight UCD 1507E.

EXAMPLE 8

A polyethylene terphthalate film backing liner corresponding to backing liner 132 is coated on one side with a silicone release coating corresponding to second release coating layer 136. The thickness of the release coated liner is 0.92 mil.

A matte release coat corresponding to first release coating layer 135 is applied to the other side of the backing liner using gravure at a coat weight of 4.4–4.6 gsm. The formulation for the matte release coat is as follows: 50.54% by weight methylisobutyl ketone, 7.84% by weight isopropanol, 8.93% by weight Lankyd 13–1425, 10.68% by weight VAGH (product of Union Carbide identified as hydroxy modified polyvinyl chloride/polyvinyl acetate copolymer), 22% by weight Microtalc MP 15–38, 2% by weight Cycat 4040, and 6.8% by weight Cymel 303. The matte release coat is dried using forced hot air at a temperature of 149° C.

A decorative layer corresponding to second printed decorative layer 160 is printed over the matte release coat at a coat weight of 0.3–1.2 gsm and dried in hot air at a temperature of 105° C. The paint composition used for this decorative layer has the following formulation (all numerical values are in parts by weight):

| | |
|---|---|
| Methylethyl ketone | 36.0 |
| Methyl propyl ketone | 35.1 |
| Kynar 7201 (SL) (product of Atofina identified as a polyvinyl fluoride copolymer) | 10.2 |
| Elvacite 2010 (product of Lucite International identified as a polymethyl methacrylate) | 3.4 |
| Tinuvin 234 | 0.27 |
| DP35740 (product of Gibraltar Chemical Works identified as a buff mixed metal oxide pigment concentrate) | 0.10 |
| DP35820 (product of Gibraltar Chemical Works identified as a brown mixed metal oxide pigment concentrate) | 11.7 |
| DP39040 (product of Gibraltar Chemical Works identified as a black mixed metal oxide pigment concentrate) | 3.3 |

A decorative layer corresponding to printed decorative layer 150 is printed over the above indicated decorative layer corresponding to second printed decorative layer 160 at a coat weight of 0.3–1.2 gsm and dried in hot air at a temperature of 105° C. The paint composition used for this decorative layer has the following formulation (all numerical values are in parts by weight):

| | |
|---|---|
| Methylethyl ketone | 34.0 |
| Methyl propyl ketone | 33.0 |
| Kynar 7201 (SL) | 9.6 |
| Elvacite 2010 | 3.2 |
| Tinuvin 234 | 0.25 |
| DP35740 | 14.4 |
| DP35820 | 5.0 |
| DP39040 | 3.2 |

The following paint composition is coated using rotogravure over the above indicated decorative layer corresponding to printed decorative layer 150 at a coat weight of 5–16 gsm and dried in hot air at a temperature of 105° C. to provide a dry paint film layer corresponding to dry paint film layer 110. In the following table, all numerical values are in parts by weight.

| | |
|---|---|
| Toluene | 19.0 |
| Methyl ethyl ketone | 23.6 |
| VYHH | 5.8 |
| Ednol 9790 | 2.9 |
| DV39600 (product of Gibraltar Chemical identified as iron oxide red pigment dispersion) | 48.6 |
| DV39420 (product of Gibraltar Chemical identified as carbon black pigment dispersion) | 0.07 |
| DV36500 (product of Gibraltar Chemical identified as Pigment Red 178 pigment dispersion) | 0.03 |
| DV34130 (product of Gibraltar Chemical identified as Phtalo Blue RS pigment dispersion) | 0.10 |

The following coating composition is coated over the above-indicated dry paint film layer using roll coating at a coat weight of 20–30 gsm and dried in hot air at a temperature of 105° C. to provide a support layer corresponding to support layer 180. In the following table, all numerical values are in parts by weight.

| | |
|---|---|
| Toluene | 14.1 |
| Methyl ethyl ketone | 21.1 |
| VYHH | 13.2 |
| Ednol 9790 | 6.6 |
| DV39600 | 44.96 |
| DV39420 | 0.04 |

A pigmented pressure sensitive adhesive is then applied over the coated layer corresponding to support layer 180 at a coat weight of 17 gsm using transfer lamination to provide an adhesive layer corresponding to pressure sensitive adhesive layer 120. The formulation for the pressure sensitive adhesive is as follows: 96% by weight of a non-tackified acrylic emulsion containing a crosslinked copolymer of butyl acrylate and ethyl hexyl acrylate, 3.7% by weight UCD 1106E, and 0.3% by weight UCD 1507E.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A multi-layer laminate comprising:
a release liner having a flexible polymeric carrier film and a matte release coat bonded to the carrier film,
a flexible dry paint transfer layer releasably adhered to the matte release coat, and
a dry pressure sensitive adhesive layer bonded to the dry paint transfer layer on a side thereof opposite the release liner,
the dry paint transfer layer including a color layer comprising a pigment contained in a polymeric binder,
the matte release coat having a level of tack that preferentially adheres the release liner to the dry paint transfer layer sufficient to provide a level of structural support for the dry paint layer when placing the adhesive side of the paint layer in contact with a substrate,
the matte release coat comprising a resinous material which has been hardened or cured to farm a microroughened surface for transferring a matte surface finish to an exposed surface of the dry paint layer when the release coat is released from contact with the dry paint layer,
the adhesive layer having a suppressed initial level of tack at room temperature that allows the laminate to adhere to a substrate followed by removal of the release liner from the dry paint layer, the adhesive layer undergoing subsequent build up of adhesion due to the passage of time sufficient to permanently bond the dry paint layer to the substrate.

2. A multi-layer laminate comprising:
a release liner having a flexible polymeric carrier film and a matte release coat bonded to the carrier film.
a flexible dry paint transfer layer releasably adhered to the matte release coat, and
a dry pressure sensitive adhesive layer banded to the dry paint transfer layer on a side thereof opposite the release liner,
the dry paint transfer layer including a color layer composing p pigment contained in a polymeric binder,
the matte release coat having a level of tack that preferentially adheres the release liner to the dry paint transfer layer sufficient to provide a level of structural support for the dry paint when placing the adhesive side of the paint layer in contact with a substrate,
the matte release coat comprising a resinous material which has been hardened or cured to form a microroughened surface for transferring a matte surface finish to an exposed surface of the dry paint layer when the release coat is released from contact with the dry paint layer,
the adhesive layer having a suppressed initial level of tack at room temperature that allows the laminate to adhere to a substrate followed by removal of the release liner from the dry paint layer, the adhesive layer undergoing subsequent build up of adhesion due to the passage of time sufficient to permanently bond the dry paint layer to the substrate,
wherein the level of gloss transferred from the matte release coat to the dry paint layer is less than 30% at 85°.

3. The laminate according to claim 1 wherein the dry paint transfer layer includes a clear cost layer overlying the color layer, and in which the clear coat is in contact with the matte release coat for transferring the micro-roughened surface to the clear coat layer.

4. The laminate according to claim 1 in which the release liner comprises a polyester film which is essentially non-stretchable at room temperature.

5. The laminate according to claim 1 which includes a reinforcing polymeric support layer between the dry paint layer and the adhesive layer, the support layer having a tensile strength greater than the dry paint layer.

6. The laminate according to claim 1 in which the matte release coat provides a differential release function in which the matte release liner preferentially adheres to the dry paint layer when the laminate is in a self-wound condition and when the laminate is unwound and positioned on and adhered to the substrate, but in which the release liner is subsequently releasable from the dry paint layer when the dry paint layer has been adhered to the substrate.

7. The laminate according to claim 1 in which the release liner further includes an adhesive release coat on a side of the liner opposite from the matte release coat.

8. The laminate of claim 7 having a self-wound form in which the release force required to separate the matte release coat from the dry paint layer is greater than the release force required to separate the adhesive release coat layer from the pressure-sensitive adhesive layer.

9. The laminate of claim 7 having a self-wound form in which the release force required to separate the matte release coat from the dry paint layer is in the range from about 20 to about 180 grams per two inches, wherein a two-inch wide sample of the release liner is separated from the dry paint layer by being pulled at the angle of 90° and at a rate of 300 inches per minute.

10. The laminate of claim 7 having a self-wound form in which the release force required to separate the adhesive release coat layer from the pressure-sensitive adhesive layer is in the range from about 30 to about 150 grams per two inches, wherein a two-inch wide sample of the release liner is separated from the dry paint layer by being pulled at the angle of 90° and at a rate of 300 inches per minute.

11. The laminate according to claim 7 having a self-wound form in which the release force required to separate the matte release coat from the dry paint layer is in the range from about 20 to about 180 grams per two inches.

12. A multi-layer laminate comprising:
a dry paint layer comprising a transparent layer and a color coat layer which includes a binder and a pigment;
a dry pressure-sensitive adhesive layer overlying the color coat side of the dry paint layer; and
a release liner overlying the transparent layer, the release liner comprising a thin, flexible polymeric carrier film and a matte release coat made from a resinous binder material which contains a matte agent and which is bonded to the carder film and releasably adhered to the transparent layer, the matte release coat material cured to a hardened state on the carrier film and in which the matte agent contained in the release coat material forms a matte surface that transfers a matte surface finish to the transparent layer when the adhesive layer is adhered to a substrate and the release liner is removed therefrom at room temperature.

13. The laminate according to claim 12 in which the transparent layer comprises an acrylic resinous material and the binder contained in the color coat layer comprises a vinyl resinous material.

14. The laminate according to claim 12 in which the matte agent comprises a dispersed particulate material.

15. A multi-layer laminate comprising:
a dry paint layer comprising a transparent layer and a color coat layer which includes a binder and a pigment;
a dry pressure-sensitive adhesive layer overlying the color coat side of the dry paint layer; and
a release liner overlying the transparent layer, the release liner comprising a thin, flexible polymeric carrier film and a matte release coat made from a resinous binder material which contains a matte agent and which is bonded to the carrier film and releasably adhered to the transparent layer, the matte release coat material cured to a hardened state on the carrier film and in which the matte agent contained in the release coat material forms a matte surface that transfers a matte surface finish to the transparent layer when the adhesive layer is adhered to a substrate and the release liner is removed therefrom at room temnerature, wherein the matte agent comprises a dispersed particulate material and the level of gloss transferred from the matte release coat to the transparent layer is less than 30% at 85°.

16. A multi-layer laminate comprising:
a dry paint layer comprising a binder and the pigment, the dry paint layer having an upper surface and a lower surface;
a dry pressure-sensitive adhesive layer overlying the upper surface of the dry paint layer; and
a release liner overlying the lower surface of the dry paint layer, the release liner having a matte release coat made from a resinous material which has been coated on the liner and cured thereon to a hardened state in which the release coat material in its cured, hardened state forms a micro-roughened matte surface spaced from the carrier film, the matte surface transferring a matte surface finish to the dry paint layer when the release liner is removed therefrom.

17. The laminate according to claim 16 in which the dry paint layer includes a transparent layer which comprises an acrylic resinous material and the binder is contained in a color coat layer which comprises a vinyl resinous material.

18. The laminate according to claim 16 in which the micro-roughened surface is formed by a dispersed particulate material contained in the matte release coat.

19. A multi-layer laminate comprising:
a dry paint layer comprising a binder and the pigment, the dry paint layer having an upper surface and a lower surface;
a dry pressure-sensitive adhesive layer overlying the upper surface of the dry paint layer; and
a release liner overlying the lower surface of the dry paint layer, the release liner having a matte release coat made from a resinous material which has been coated on the liner and cured thereon to a hardened state in which the release coat material in its cured hardened state forms a micro-roughened matte surface spaced from the carrier film, the matte surface transferring a matte surface finish to the dry paint layer when the release liner is removed therefrom, wherein the level of gloss transferred from the matte release coat to the dry paint layer is less than 30% at 85°.

20. The laminate according to claim 16 in which the pressure-sensitive adhesive comprises a crosslinked acrylic resinous material.

21. The laminate according to claim 16 in which the release liner further includes an adhesive release coat on a side of the liner opposite from the matte release coat.

22. The laminate of claim 21 having self-wound form in which the release force required to separate the release coat layer from the dry paint layer is greater than the release force required to separate the adhesive release coat layer from the adhesive layer.

23. The laminate according to claim 22 in which the pressure-sensitive adhesive comprises a crosslinked acrylic resinous material.

24. The laminate according to claim 16 in which the matte release coat material consists essentially of a crosslinked acrylic modified alkyd resin and vinyl resinous material and a dispersed particulate material.

25. A multi-layer laminate comprising:
a release liner having a flexible polymeric carrier film and a matte release coat bonded to the carrier film,
a flexible dry paint transfer layer releasably adhered to the matte release coat, and
a dry pressure-sensitive adhesive layer bonded to the dry paint transfer layer on a side thereof opposite the release liner,
the dry paint transfer layer including a color layer comprising a pigment contained in a polymeric binder,
the matte release coat having a level of tack that preferentially adheres the release liner to the dry paint transfer layer sufficient to provide a level of structural support for the dry paint layer when placing the adhesive side of the dry paint layer in contact with a substrate,
the matte release coat comprising a resinous material containing a dispersed particulate material in which the matte release coat material has been hardened or cured so the particles form a micro-roughened surface for transferring a matte surface finish to an exposed surface of the dry paint layer when the release coat is released from contact with the dry paint layer, the transferred matte uniform finish having a gloss level of less than 30% at 85°,
the adhesive layer having a suppressed initial level of tack at room temperature that allows the laminate to adhere to a substrate followed by removal of the release liner from the dry paint layer, the adhesive layer undergoing subsequent build up of adhesion due to the passage of time sufficient to permanently bond the dry paint layer to the substrate.

26. The laminate according to claim 25 in which the release liner further includes an adhesive release coat on a side of the liner opposite from the matte release coat.

27. The laminate according to claim 26 having a self-wound form in which the release force required to separate the release coat layer from the dry paint layer is greater than the release force required to separate the adhesive release coat layer from the adhesive layer.

28. The laminate according to claim 27 in which the pressure-sensitive adhesive comprises a crosslinked acrylic resinous material.

29. The laminate according to claim 25 which includes a reinforcing polymeric support layer between the dry paint layer and the adhesive layer, the support layer having a tensile strength greater than the dry paint layer.

30. A multi-layer laminate comprising a dry paint layer for interior use comprising a binder and a pigment, a pressure-sensitive adhesive layer overlying one surface of the dry paint layer for adhering the dry paint layer to a wall, a release liner overlying a surface of the dry paint layer opposite the adhesive layer, the release liner removable from the dry paint layer upon attachment of the dry paint layer to a wall via the pressure-sensitive adhesive, the dry paint layer having a matte finish on its exposed surface, the improvement in which the release liner comprises a thin, flexible polymeric carrier film and a matte release coat on the carrier film in overlying contact with the dry paint layer, the matte release coat made from a resinous coating material having a hardened state at room temperature in which the coating material forms a matte surface that transfers a matte surface finish to an exposed surface of the dry paint layer when the adhesive layer is adhered to a wall and the release liner is removed from the dry paint layer, the transferred matte surface having a gloss level of less than 30% at 85°.

31. The improvement according to claim 30 in which the transparent layer comprises an acrylic resinous material and the binder contained in the color coat layer comprises a vinyl resinous material.

32. The improvement according to claim 30 in which the micro-roughened surface is formed by a dispersed particulate material contained in the matte release coat.

33. The improvement according to claim 32 in which the pressure-sensitive adhesive comprises a crosslinked acrylic resinous material.

34. A multi-layer laminate comprising a dry paint layer for interior use comprising a binder and a pigment, a pressure-sensitive adhesive layer overlying one surface of the dry paint layer for adhering the dry paint layer to a wall, a release liner overlying a surface of the dry paint layer opposite the adhesive layer, the release liner removable from the dry paint layer upon attachment of the dry paint layer to a wall via the pressure sensitive adhesive, the dry paint layer having a matte finish on its exposed surface, the improvement in which the release liner comprises a thin, flexible polymeric carrier film and a matte release coat on the carrier film made from a thermoset resinous material which is bonded to the carrier film and forms a matte surface that transfers a matte surface finish to the dry paint layer at a gloss level of less than 30% at 85° when the adhesive layer is adhered to a wall and the release liner is removed from me paint layer at room temperature.

35. The improvement according to claim 34 in which the matte surface is a micro-roughened surface.

36. The improvement according to claim 34 in which the adhesive has a suppressed initial level of tack at room temperature and undergoes an increase in adhesive over time to a permanent bond to the wall.

37. The improvement according to claim 36 in which the pressure-sensitive adhesive comprises a crosslinked acrylic resinous material.

38. A dry paint transfer laminate for interior use as an interior wall covering comprising a dry paint layer releasably attached to a release liner to provide support for the dry paint layer, and a layer of pressure-sensitive adhesive on a side of the dry paint layer opposite the release liner for attaching the paint layer to an interior wall, in which the release liner has a release coat which is removable from the dry paint layer to expose the dry paint layer as a painted interior wall covering, and in which the release liner has an adhesive release coat on a side of the liner opposite the release coat that contacts the dry paint layer, the improvement in which the release liner comprises a polymeric carrier film and the release coat thereon comprises a matte release coat bonded to the carrier film and in contact with the dry paint layer, the matte release coat made from a material which in a hardened state forms a micro-roughened surface spaced from the carrier film end has a level of adhesion that adheres the release liner to the dry paint layer but transfers a matte finish to an exposed surface of the dry paint layer when the adhesive layer adheres the laminate to a wall and the release liner is released from contact with the dry paint layer at room temperature, the laminate having a self-wound form in which the release force required to separate the matte release coat from the dry paint layer is greater than the release force required to separate the adhesive release coat from the adhesive layer, the matte release coat having a level of release force sufficient to remove the liner and transfer the matte surface to the dry paint layer while maintaining the integrity of the dry paint layer on the wall and without releasing it from its attachment to the wall.

39. The improvement according to claim 38 in which the dry paint layer includes a transparent layer which comprises an acrylic resinous material and the binder is contained in a color coat layer which comprises a vinyl resinous material.

40. The improvement according to claim 38 in which the micro-roughened surface is formed by a dispersed particulate material contained in the matte release coat.

41. A dry paint transfer laminate for interior use as an interior wall covering comprising a dry paint layer releasably attached to a release liner to provide support for the dry paint layer, and a layer of pressure-sensitive adhesive on a side of the dry paint layer opposite the release liner for attaching the paint layer to an interior wall, in which the release liner has a release coat which is removable from the dry paint layer to expose the dry paint layer as a painted interior wall covering, and in which the release liner has an adhesive release coat on a side of the liner opposite the release coat that contacts the dry paint layer, the improvement in which the release liner comprises a polymeric carrier film and the release coat thereon comprises a matte release coat bonded to the carrier film and in contact with the dry paint layer, the matte release coat made from a material which in a hardened state forms a micro-roughened surface spaced from the carrier film and has a level of adhesion that adheres the release liner to the dry paint layer but transfers a matte finish to an exposed surface of the dry paint layer when the adhesive layer adheres the laminate to a wall and the release liner is released from contact with the dry paint layer at room temperature, the laminate having a self-wound form in which the release force required to separate the matte release coat from the dry paint layer is greater than the release force required to separate the adhesive release coat from the adhesive layer, the matte release coat having a level of release force sufficient to remove the liner and transfer the matte surface to the dry paint layer while maintaining the integrity of the dry paint layer of the wall and without relising it from its attachment to the wall, wherein the level of gloss transferred from the matte release coat to the dry paint layer is less than 30% at 85°.

42. The improvement according to claim 38 in which the pressure-sensitive adhesive comprises a crosslinked acrylic resinous material.

43. The improvement according to claim 38 which includes a reinforcing polymeric support layer between the dry paint layer and the adhesive layer, the support layer having a tensile strength greater than the dry paint layer.

44. A multi-layer laminate comprising:
a dry paint layer comprising a binder and the pigment the dry paint layer having an upper surface and a lower surface;
a dry pressure-sensitive adhesive layer overlying the upper surface of the dry paint layer; and
a release liner overlying the lower surface of the dry paint layer, the release liner having a matte release coat made from a resinous material which has been coated on the liner and cured thereon to a hardened state in which the release coat material in its cured, hardened state forms a micro-roughened matte surface spaced from the carrier film, the matte surface transferring a matte surface finish to the dry paint layer when the release liner is removed therefrom,
wherein the pressure-sensitive adhesive comprises an internally crosslinked acrylic emulsion, a crosslinked copolymer emulsion of butyl acrylate and ethyl hexyl acrylate, or a non-tackified acrylic emulsion.

45. A dry paint transfer laminate for interior use as an interior wall coveting comprising a dry paint layer releasably attached to a release liner to provide support for the dry paint layer, and a layer of pressure-sensitive adhesive on a side of the dry paint layer opposite the release liner for attaching the paint layer to an interior wall, in which the release liner has a release coat which is removable from the dry paint layer to expose the dry paint layer as a painted interior wall covering, and in which the release liner has an adhesive release coat on a side of the liner opposite the release coat that contacts the dry paint layer, the improvement in which the release liner comprises a polymeric carrier film and the release coat thereon comprises a matte release coat bonded to the carrier film and in contact with the dry paint layer, the matte release coat made from a material which in a hardened state forms a micro-roughened surface spaced from the carrier film and has a level of adhesion that adheres the release liner to the dry paint layer but transfers a matte finish to an exposed surface of the dry paint layer when the adhesive layer adheres the laminate to a wall and the release liner is released from contact with the dry paint layer at room temperature, the laminate having a self-wound form in which the release force required to separate the matte release coat from the dry paint layer is greater than the release force required to separate the adhesive release coat from the adhesive layer, the matte release coat having a level of release force sufficient to remove the liner and transfer the matte surface to the dry paint layer while maintaining the integrity of the dry paint layer on the wall and without releasing it from its attachment to the wall,
wherein the pressure-sensitive adhesive comprises an internally crosslinked acrylic emulsion, a crosslinked copolyrner emulsion of butyl acrylate and ethyl hexyl acrylate, or a non-tackifled acrylic emulsion.

* * * * *

UNITED STATES PATENT AND TRADEMARK OFFICE
CERTIFICATE OF CORRECTION

PATENT NO. : 7,132,142 B2
APPLICATION NO. : 10/457826
DATED : November 7, 2006
INVENTOR(S) : Truog et al.

It is certified that error appears in the above-identified patent and that said Letters Patent is hereby corrected as shown below:

Col. 11, Ln. 27, replace "a-olefin" with --α-olefin--.

(Col. 34, Ln. 22), replace "to farm a" with --to form a--.

(Col. 34, Ln. 39), replace "layer banded to" with --layer bonded to--.

(Col. 34, Ln. 43), replace "layer composing p pigment" with --layer comprising a pigment--.

(Col. 34, Ln. 67), replace "clear cost layer" with --clear coat layer--.

(Col. 35, Ln. 54), replace "the carder film" with --the carrier film--.

(Col. 36, Ln. 17), replace "room temnerature, wherein" with --room temperature, wherein--.

(Col. 36. Ln. 66), replace "having self-wound form" with --having a self-wound form--.

(Col. 38, Ln. 36), replace "from me" with --from the--.

(Col. 38, Ln. 64), replace "film end has" with --film and has--.

(Col. 39, Lns. 46-47), replace "layer of the wall and without relising" with --layer on the wall and without releasing--.

(Col. 40, Ln. 22), replace "wall coveting comprising" with --wall covering comprising--.

(Col. 40, Ln. 53), replace "copyrner emulsion" with --copolymer emulsion--.

UNITED STATES PATENT AND TRADEMARK OFFICE
CERTIFICATE OF CORRECTION

PATENT NO. : 7,132,142 B2
APPLICATION NO. : 10/457826
DATED : November 7, 2006
INVENTOR(S) : Truog et al.

It is certified that error appears in the above-identified patent and that said Letters Patent is hereby corrected as shown below:

(Col. 40, Ln. 54), replace "a non-tackifled acrylic" with --a non-tackified acrylic--.

Signed and Sealed this

Sixth Day of March, 2007

JON W. DUDAS
*Director of the United States Patent and Trademark Office*